(12) United States Patent
Lee et al.

(10) Patent No.: US 9,773,158 B2
(45) Date of Patent: Sep. 26, 2017

(54) MOBILE DEVICE HAVING FACE RECOGNITION FUNCTION USING ADDITIONAL COMPONENT AND METHOD FOR CONTROLLING THE MOBILE DEVICE

(71) Applicant: Samsung Electronics Co., Ltd., Suwon-si, Gyeonggi-do (KR)

(72) Inventors: Yu-Jin Lee, Seoul (KR); Sung-Jin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/132,514

(22) Filed: Dec. 18, 2013

(65) Prior Publication Data

US 2014/0169641 A1   Jun. 19, 2014

(30) Foreign Application Priority Data

Dec. 18, 2012   (KR) ........................ 10-2012-0148449

(51) Int. Cl.
  *G06K 9/00*   (2006.01)
  *G06F 3/01*   (2006.01)
  (Continued)

(52) U.S. Cl.
  CPC .......... *G06K 9/00268* (2013.01); *G06F 3/011* (2013.01); *G06F 3/017* (2013.01);
  (Continued)

(58) Field of Classification Search
  None
  See application file for complete search history.

(56) References Cited

U.S. PATENT DOCUMENTS

2005/0233766 A1* 10/2005 Futami .................... H04M 1/64
  455/556.1
2007/0060336 A1* 3/2007 Marks ..................... A63F 13/02
  463/3

(Continued)

FOREIGN PATENT DOCUMENTS

| KR | 10-2010-0046361 A | 5/2010 |
| KR | 10-2011-0040199 A | 4/2011 |
| KR | 10-2012-0014480 A | 2/2012 |

*Primary Examiner* — Ryan P Potts
(74) *Attorney, Agent, or Firm* — Jefferson IP Law, LLP

(57) ABSTRACT

A method and a mobile device having a face recognition function using an additional component. The method includes determining whether the face recognition function has been activated in a first state of the mobile device, acquiring an image if the face recognition function has been activated, extracting a facial figure or at least one main component included in the facial figure by analyzing the acquired image, determining whether a face recognized from the image matches a registered user's face based on the facial figure or the at least one main component, determining whether an additional figure recognition function has been activated, extracting an additional figure or at least one additional component included in the additional figure, if the additional figure recognition function has been activated, and switching the mobile device to a predetermined second state corresponding to the additional figure or the at least one additional component.

23 Claims, 24 Drawing Sheets

(51) Int. Cl.
*G06F 21/32* (2013.01)
*G06F 21/36* (2013.01)

(52) U.S. Cl.
CPC .............. *G06F 21/32* (2013.01); *G06F 21/36* (2013.01); *G06K 9/00355* (2013.01)

(56) References Cited

U.S. PATENT DOCUMENTS

| | | |
|---|---|---|
| 2008/0187184 A1* | 8/2008 | Yen ................. 382/118 |
| 2009/0160609 A1* | 6/2009 | Lin .................. G06F 21/32 340/5.83 |
| 2010/0157088 A1* | 6/2010 | Irimoto ............ 348/222.1 |
| 2010/0205667 A1 | 8/2010 | Anderson et al. |
| 2010/0301995 A1 | 12/2010 | Nguyen et al. |
| 2011/0098024 A1 | 4/2011 | Shin et al. |
| 2011/0129124 A1* | 6/2011 | Givon .............. G06F 3/011 382/107 |
| 2012/0081282 A1 | 4/2012 | Chin |
| 2012/0220338 A1* | 8/2012 | Degrazia .......... H04M 1/72519 455/556.1 |
| 2012/0295661 A1 | 11/2012 | Kim et al. |
| 2013/0076507 A1* | 3/2013 | Petricoin, Jr. ........ 340/539.11 |
| 2013/0136363 A1 | 5/2013 | Na |
| 2013/0271360 A1* | 10/2013 | Macdougall ...... H04M 1/72519 345/156 |
| 2013/0278493 A1* | 10/2013 | Wei .................. G06K 9/00355 345/156 |

* cited by examiner

MOBILE DEVICE HAVING FACE RECOGNITION FUNCTION USING ADDITIONAL COMPONENT AND METHOD FOR CONTROLLING THE MOBILE DEVICE

PRIORITY

This application claims the benefit under 35 U.S.C. §119(a) of a Korean patent application filed on Dec. 18, 2012 in the Korean Intellectual Property Office and assigned Serial No. 10-2012-0148449, the entire disclosure of which is incorporated hereby by reference.

BACKGROUND OF THE INVENTION

1. Field of the Invention

The present invention relates to a User Interface (UI) in a mobile device. More particularly, the present invention relates to a face recognition function.

2. Description of the Related Art

Various types of UIs are used in a mobile device. A recently developed mobile device equipped with a touch screen provides a UI that allow a user to touch a screen displayed on the touch screen.

Recently, a UI using an image captured by a camera has been developed. The camera-based UI captures a user input (i.e., a user's gesture) through the camera, analyzes the captured image, and executes a function corresponding to the user input in the mobile device.

The camera-based UI is being developed to have a face recognition function for capturing a user's face through the camera and analyzing the captured facial image. However, it is difficult to provide various UIs simply with the captured facial image in the face recognition function.

Accordingly, there exists a need for a UI using component in addition to a face. In addition, a UI function is needed, which can provide various user input corresponding to additional components as well as recognizing a face.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. It is an aim of certain aspects and/or embodiments of the invention to solve, mitigate or obviate, at least partly, at least one of the problems and/or disadvantages associated with the prior art. Certain aspects and/or embodiments aim to provide at least one of the advantages described below. Accordingly, an aspect of the present invention is to provide a mobile device having an enhanced face recognition function by means of an additional component and a method for controlling the same.

Another aspect of the present invention is to provide a mobile device for extracting an additional figure or an additional component by analyzing an image acquired through a camera and a method for controlling the same.

Another aspect of the present invention is to provide a mobile device for switching to a preset state corresponding to an additional figure or an additional component and a method for controlling the same.

Another aspect of the present invention is to provide a mobile device for providing an unlock function by a face recognition function, extracting an additional figure or additional component, and switching to a preset state corresponding to the extracted additional figure or additional component, and a method for controlling the same.

Another aspect of the present invention is to provide a mobile device for executing a predetermined action corresponding to an additional figure or an additional component and a method for controlling the same.

Another aspect of the present invention is to provide a mobile device for extracting at least one additional component and switching to a preset state corresponding to at least one of the number of the at least one additional component, the presence or absence of any additional component in the vicinity of a main component, the shape of the at least one additional component, and a motion of the at least one additional component, and a method for controlling the same.

Another aspect of the present invention is to provide a mobile device for extracting an object figure or an additional component and switching to a preset state corresponding to the additional component and a method for controlling the same.

In accordance with an aspect of the present invention, a method for controlling a mobile device having a face recognition function using an additional component is provided. The method includes determining whether the face recognition function has been activated (e.g. in a first state of the mobile device), acquiring an image through a camera, if the face recognition function has been activated, extracting at least one of a facial figure and at least one main component included in the facial figure by analyzing the acquired image, determining whether a face recognized from the image matches a registered user's face based on the at least one of the facial figure and the at least one main component, determining whether an additional figure recognition function has been activated, extracting at least one of an additional figure or at least one additional component included in the additional figure, if the additional figure recognition function has been activated, and switching the mobile device to a predetermined second state corresponding to the at least one of the additional figure and the at least one additional component.

In accordance with another aspect of the present invention, a mobile device having a face recognition function using an additional component is provided. The mobile device includes a camera for acquiring an image, and a controller for determining whether the face recognition function has been activated (e.g. in a first state of the mobile device), for controlling the camera to acquire an image, if the face recognition function has been activated, for extracting at least one of a facial figure or at least one main component included in the facial figure by analyzing the acquired image, for determining whether a face recognized from the image matches a registered user's face based on the at least one of the facial figure and the at least one main component, for determining whether an additional figure recognition function has been activated, for extracting at least one of an additional figure and at least one additional component included in the additional figure, if the additional figure recognition function has been activated, and for switching the mobile device to a predetermined second state corresponding to the at least one of the additional figure and the at least one additional component.

Another aspect of the invention provides a mobile device having a camera, the mobile device being adapted to capture or view an image with the camera, analyze (process) the image to recognize a face in the image and to recognize at least one additional element in the image, and perform an operation according to the at least one additional element.

In certain embodiments, the mobile device is further adapted to determine whether a face recognized in the image corresponds to a user registered to use the mobile device. In such embodiments, the device may be further adapted to switch from a locked state to an unlocked state when the recognized face corresponds to a registered user. In such embodiments the device may be adapted to make this determination based on registered user data (e.g. indicative of their facial features) stored in memory in the device or stored externally (in which case the device may be further adapted to communicate with at least one external or remote device). In certain embodiments, the performance of the operation is conditional upon the detected face being the face of a registered user.

In certain embodiments, the at least one additional element comprises a user's hand. In such embodiments, the device may be further adapted to recognize a plurality of different hand gestures (e.g. comprising different shapes, configurations, and/or movements) and perform a selected one of a plurality of different operations according to the detected/recognized hand gesture. For example, the device may be adapted to execute or switch to a phone application in response to the user's hand making a "phone" gesture, with thumb and small finger extended and the remaining fingers closed onto the palm of the hand. In certain embodiments, the device may determine the operation to be performed according to the position of the detected hand, or one or more components (e.g. fingers) of the detected hand, relative to the detected face, or to one or more components of the detected face. For example, the device may execute, or switch to, a camera application in response to detecting a user's finger, or fingers, positioned close to (i.e. within a predetermined distance of), or pointing to, a user's eye. Detecting a user's hand pointing to or touching the user's mouth may, for example, be used to switch to a dictation/voice memo function. In further embodiments, the operation performed may depend on a detected motion or movement of the detected hand (or one or more components of the detected hand). In certain embodiments, the device may be adapted to determine which operation to perform according to the number of fingers held up in the detected image. Holding up one finger may lead to a first application being executed, holding up two fingers may lead to a second application being detected, etc.

In certain embodiments, the at least one additional component may comprise a pen or stylus, or other such device suitable for making inputs to a touch screen for example. In such embodiments, the device may be adapted to switch to a note, memo or sketchpad application (or other application with which pen or stylus inputs, for example to a touch screen, may be used) in response to detecting the pen or stylus in the image.

Another aspect of the invention provides a method of operating a mobile device comprising a camera, the method comprising capturing or viewing an image with the camera, analyzing (processing) the image to recognize a face in the image and to recognize at least one additional element in the image, and performing an operation according to the at least one additional element.

Embodiments of this aspect may incorporate features corresponding to any of those discussed above, or indeed subsequently, in relation to other aspects.

Another aspect provides a mobile device adapted to implement a method in accordance with any of the above-described aspects.

Another aspect of the invention provides a computer program comprising instructions arranged, when executed, to implement a method and/or apparatus in accordance with any one of the above-described aspects. A further aspect provides machine-readable storage storing such a program.

It will be appreciated from the following description that, in certain embodiments of the invention, features concerning the graphic design of user interfaces are combined with interaction steps or means to achieve a technical effect.

Certain embodiments aim to achieve the technical effect of enhancing the precision of an input device.

Certain embodiments aim to achieve the technical effect of lowering a burden (e.g. a cognitive, operative, operational, operating, or manipulative burden) of a user when performing certain computer or device interactions.

Certain embodiments aim to achieve the technical effect of providing a more efficient man-machine (user-machine) interface.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While ordinal numbers like first, second, etc. can be used to describe a number of components, these components are not limited by the terms. The terms are used to distinguish one component from other components. For example, a first component may be referred to as a second component or vice versa within the scope and spirit of the present invention. The term 'and/or' means inclusion of a combination of a plurality of described associated items or one of the items.

The technical terms used herein are provided simply to describe specific exemplary embodiments, not intended to restrict the present invention. Herein, singular expressions include plural expressions unless otherwise clarified in the context. In this description, the term 'include' or 'have' is not interpreted as necessarily including all of the features, numbers, steps, operations, components, parts, or a combination thereof described in the specification. Rather, it should be understood that there are possibilities of omitting or adding one or more features, numbers, steps, operations, components, parts, or combinations thereof.

Unless otherwise defined, all the terms used herein including technical or scientific terms have the same meanings as terms generally understood by those skilled in the art. In addition, terms defined in a general dictionary should be understood so as to have the same meanings as contextual meanings of the related art. Unless definitely defined herein, the terms should not be interpreted as ideal or excessively formal meanings.

Figure 1:
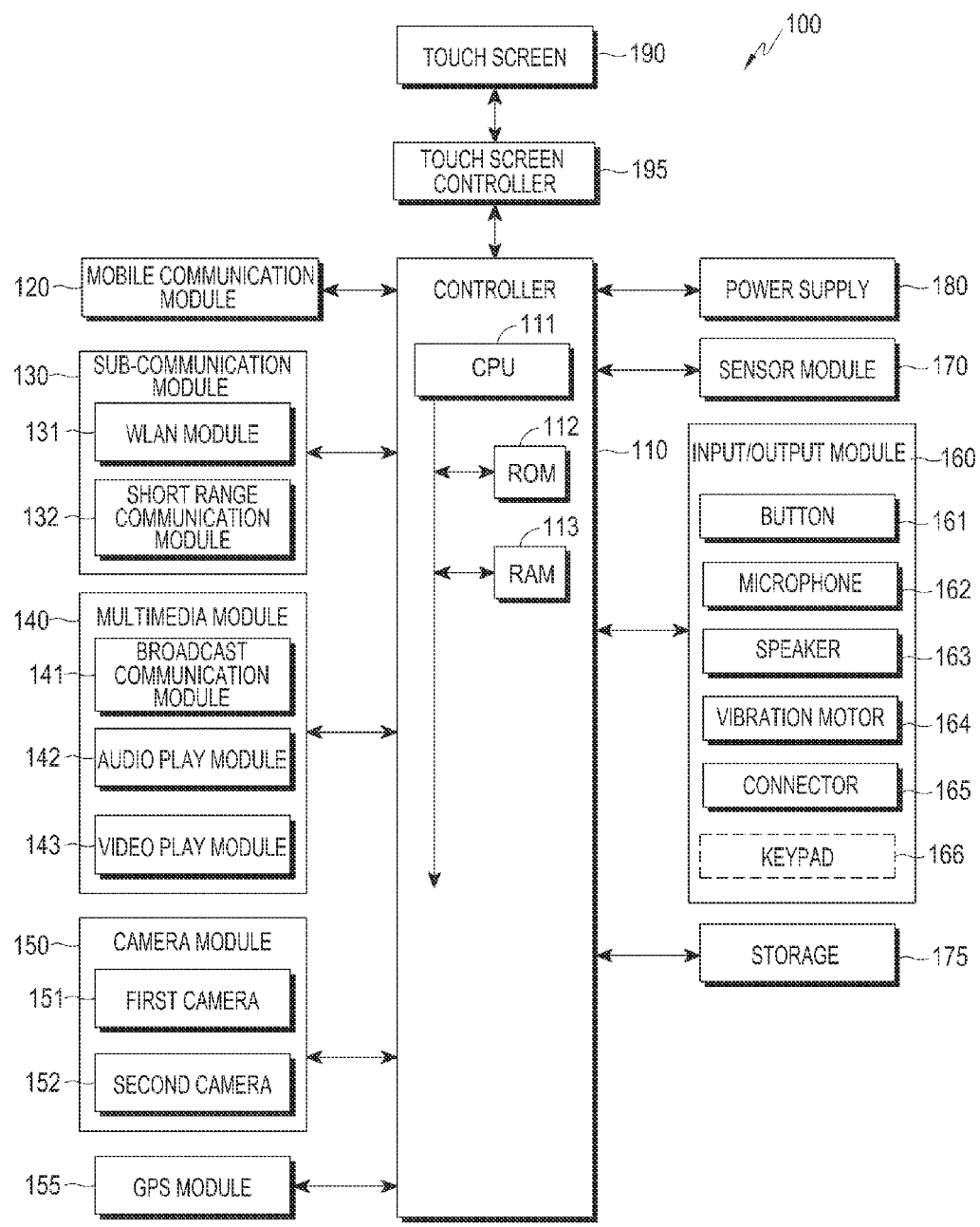
FIG. 1 is a block diagram of a mobile device according to an exemplary embodiment of the present invention.

FIG. 1 is a block diagram of a mobile device according to an exemplary embodiment of the present invention.

Figure 3:
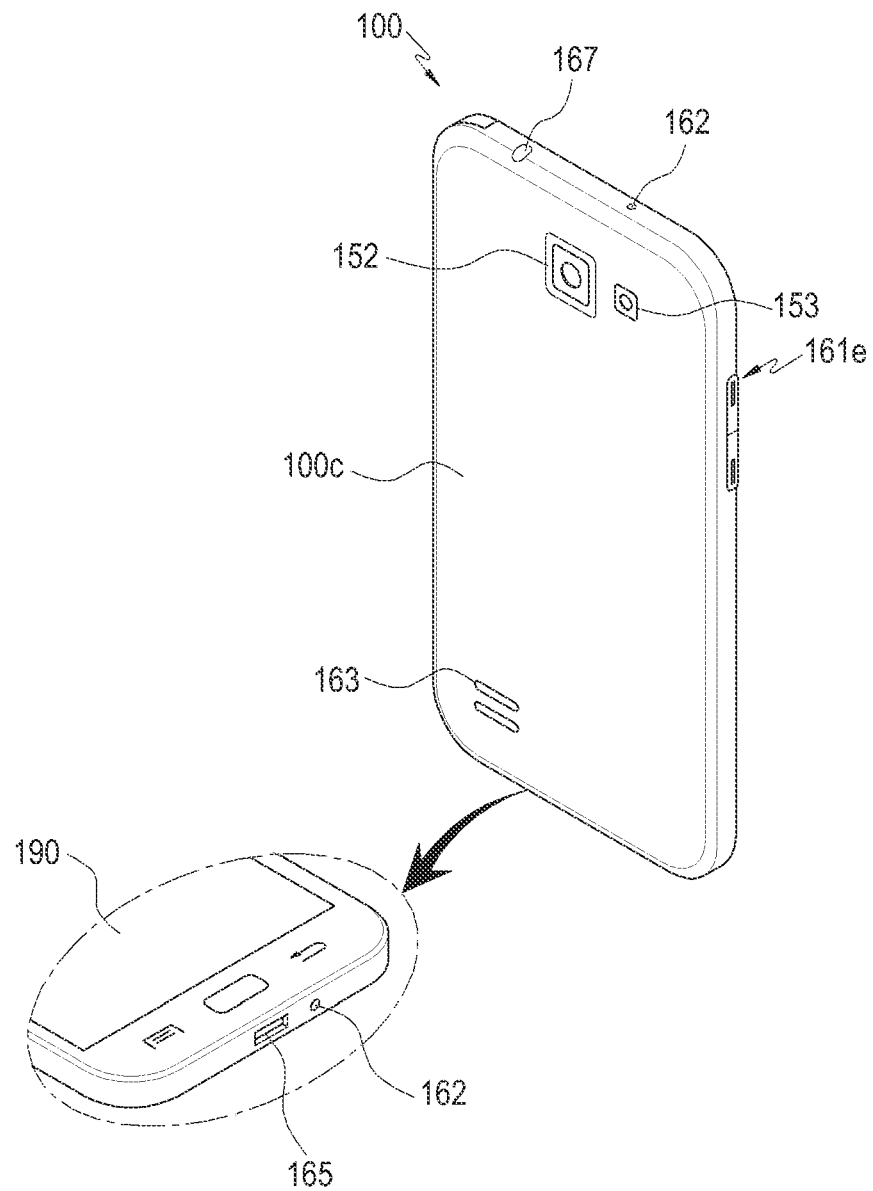
FIG. 3 is a rear perspective view of a mobile device according to an exemplary embodiment of the present invention.

Referring to FIG. 1, the mobile device 100 may be connected to an external device (not shown) through an external device interface such as a sub-communication module 130, a connector 165, and an earphone connector jack 167 (shown in FIG. 3). The term 'external device' covers a variety of devices that can be detachably connected to the mobile device 100 by wire, such as an earphone, an external speaker, a Universal Serial Bus (USB) memory, a charger, a cradle, a docking station, a Digital Multimedia Broadcasting (DMB) antenna, a mobile payment device, a health care device (e.g. a blood sugar meter, etc.), a game console, a vehicle navigator, and the like. The 'external device' may include a device wirelessly connectable to the mobile device 100 by short-range communication, such as a Bluetooth communication device, a Near Field Communication (NFC) device, a Wi-Fi Direct communication device, and a wireless Access Point (AP). In addition, the external device may be any of another mobile device, a portable phone, a smart phone, a tablet PC, a desktop PC, and a server.

The mobile device 100 includes a display 190 and a display controller 195. The mobile device 100 further includes a controller 110, a mobile communication module 120, the sub-communication module 130, a multimedia module 140, a camera module 150, a Global Positioning System (GPS) module 155, an Input/Output (I/O) module 160, a sensor module 170, a memory (storage) 175, and a power supply 180. The sub-communication module 130 includes at least one of a Wireless Local Area Network (WLAN) module 131 and a short-range communication module 132. The multimedia module 140 includes at least one of a broadcasting communication module 141, an audio play module 142, and a video play module 143. The camera module 150 includes at least one of a first camera 151 and a second camera 152, and the I/O module 160 includes at least one of buttons 161, a microphone 162, a speaker 163, a vibration motor 164, the connector 165, a keypad 166, and the earphone connector jack 167. The following description is given with the appreciation that the display 190 and the display controller 195 are a touch screen and a touch screen controller, respectively, by way of example.

The controller 110 may include a Central Processing Unit (CPU) 111, a Read Only Memory (ROM) 112 for storing a control program to control the mobile device 100, and a Random Access Memory (RAM) 113 for storing signals or data received from the outside of the mobile device 100 or for use as a memory space for an operation performed by the mobile device 100. The CPU 111 may include one or more cores. The CPU 111, the ROM 112, and the RAM 113 may be connected to one another through an internal bus.

The controller 110 may control the mobile communication module 120, the sub-communication module 130, the multimedia module 140, the camera module 150, the GPS module 155, the I/O module 160, the sensor module 170, the memory 175, the power supply 180, the touch screen 190, and the touch screen controller 195.

The mobile communication module 120 connects the mobile device 100 to an external device through one or more antennas (not shown) by mobile communication under the control of the controller 110. The mobile communication module 120 transmits wireless signals to or receives wireless signals from a portable phone (not shown), a smart phone (not shown), a tablet PC (not shown), or another mobile device (not shown) that has a phone number input to the mobile device 100, for voice call, video call, Short Message Service (SMS), or Multimedia Messaging Service (MMS).

The sub-communication module 130 may include at least one of the WLAN module 131 and the short-range communication module 132.

The WLAN module 131 may be connected to the Internet under the control of the controller 110 in a place where a wireless AP (not shown) is installed. The WLAN module 131 supports the WLAN standard IEEE802.11x of the Institute of Electrical and Electronics Engineers (IEEE). The short-range communication module 132 may conduct short-range wireless communication between the mobile device 100 and an image forming device (not shown) under the control of the controller 110. The short-range communication may conform to Bluetooth, Infrared Data Association (IrDA), WiFi Direct, NFC, etc.

The mobile device 100 may include at least one of the mobile communication module 120, the WLAN module 131, and the short-range communication module 132 according to a function of the mobile device 100. For example, the mobile device 100 may include a combination of the mobile communication module 120, the WLAN module 131, and the short-range communication module 132 according to its capabilities.

The multimedia module 140 may include the broadcasting communication module 141, the audio play module 142, or the video play module 143. The broadcasting communication module 141 may receive a broadcast signal (for example, a TV broadcast signal, a radio broadcast signal, or a data broadcast signal) and additional broadcasting information (for example, an Electronic Program Guide (EPG) or Electronic Service Guide (ESG)) from a broadcasting station through a broadcasting communication antenna (not shown) under the control of the controller 110. The audio play module 142 may open a stored or received digital audio file (for example, a file having such an extension as mp3, wma, ogg, or way) under the control of the controller 110. The video play module 143 may open a stored or received digital video file (for example, a file having an extension such as mpeg, mpg, mp4, avi, mov, or mkv) under the control of the controller 110. The video play module 143 may also open a digital audio file.

The multimedia module 140 may include the audio play module 142 and the video play module 143 without the broadcasting communication module 141. Alternatively, the audio play module 142 or the video play module 143 of the multimedia module 140 may be incorporated into the controller 110.

The camera module 150 may include at least one of the first camera 151 and the second camera 152, for capturing a still image or a video under the control of the controller 110. The first camera 151 or the second camera 152 may include an auxiliary light source (for example, a flash (not shown)) for providing a light intensity required for capturing an image. The first camera 151 may be disposed on the front surface of the mobile device 100, while the second camera 152 may be disposed on the rear surface of the device 100. Alternatively the first camera 151 and the second camera 152 may be arranged near to each other (for example, the distance between the first camera 151 and the second camera 152 may be between 1 cm and 8 cm) in order to capture a three-dimensional still image or video.

The GPS module 155 may receive signal waves from a plurality of GPS satellites (not shown) in Earth orbit and calculate a position of the mobile device 100 based on the Time of Arrivals (ToAs) of satellite signals from the GPS satellites to the mobile device 100.

The I/O module 160 may include at least one of a plurality of buttons 161, the microphone 162, the speaker 163, the vibration motor 164, the connector 165, and the keypad 166.

The buttons 161 may be formed on the front surface, a side surface, or the rear surface of a housing of the mobile device 100, and may include at least one of a power/lock button, a volume button, a menu button, a home button, a back button, and a search button.

The microphone 162 receives voice or sound and converts the received voice or sound to an electrical signal under the control of the controller 110.

The speaker 163 may output sounds corresponding to various signals (for example, a wireless signal, a broadcast signal, a digital audio file, a digital video file, a photo shot, etc.) received from the mobile communication module 120, the sub-communication module 130, the multimedia module 140, and the camera module 150 to the outside of the mobile device 100. The speaker 163 may output sounds corresponding to functions (for example, a button manipulation sound or a ringback tone for a call) performed by the mobile device 100. One or more speakers 163 may be disposed at an appropriate position or positions of the housing of the mobile device 100.

The vibration motor 164 may convert an electrical signal to a mechanical vibration under the control of the controller 110. For example, when the mobile device 100 receives an incoming voice call from another mobile device (not shown) in vibration mode, the vibration motor 164 operates. One or more vibration motors 164 may be mounted inside the housing of the mobile device 100. The vibration motor 164 may operate in response to a user's touch on the touch screen 190 and a continuous movement of the touch on the touch screen 190.

The connector 165 may be used as an interface for connecting the mobile device 100 to an external device (not shown) or a power source (not shown). The connector 165 may transmit data stored in the memory 175 to the external device via a cable connected to the connector 165 or may receive data from the external device via the cable, under the control of the controller 110. The external device may be a docking station and the data may be a signal received from an external input device, for example, a mouse or a keyboard. The mobile device 100 may receive power or charge a battery (not shown) from the power source via the cable connected to the connector 165.

The keypad 166 may receive a key input from the user to control the mobile device 100. The keypad 166 includes a physical keypad (not shown) formed in the mobile device 100 or a virtual keypad (not shown) displayed on the display 190. The physical keypad may not be provided according to the capabilities or configuration of the mobile device 100.

An earphone (not shown) may be inserted into the earphone connector jack 167 and thus connected to the mobile device 100.

The sensor module 170 includes at least one sensor (not shown) for detecting a state of the mobile device 100. For example, the sensor module 170 may include a proximity sensor for detecting whether the user is close to the mobile device 100, an illuminance sensor for detecting the amount of ambient light around the mobile device 100, a motion sensor for detecting a motion of the mobile device 100 (for example, rotation, acceleration or vibration of the mobile device 100), a geomagnetic sensor for detecting a point of the compass using the earth's magnetic field, a gravity sensor for detecting the direction of gravity, and an altimeter for detecting an altitude by measuring the air pressure. At least one sensor may detect a state of the mobile device 100, generate a signal corresponding to the detected state, and transmit the generated signal to the controller 110. A sensor may be added to or removed from the sensor module 170 according to the capabilities of the mobile device 100.

The memory 175 may store input/output signals or data in accordance with operations of the mobile communication module 120, the sub-communication module 130, the multimedia module 140, the camera module 150, the GPS module 155, the I/O module 160, the sensor module 170, and the touch screen 190 under the control of the controller 110. The memory 175 may store a control program for controlling the mobile device 100 or the controller 110, and applications.

The term "memory" covers the memory 175, the ROM 112 and the RAM 113 within the controller 110, or a memory card (not shown) (e.g. a Secure Digital (SD) card or a memory stick) mounted to the mobile device 100. The memory may include a non-volatile memory, a volatile memory, a Hard Disk Drive (HDD), or a Solid State Drive (SSD).

The power supply 180 may supply power to one or more batteries (not shown) mounted in the housing of the mobile device 100 under the control of the controller 110. The one or more batteries supply power to the mobile device 100. Further, the power supply 180 may supply power received from an external power source (not shown) via the cable connected to the connector 165 to the mobile device 100. The power supply 180 may also supply power received wirelessly from the external power source to the mobile device 100 by a wireless charging technology.

The touch screen 190 may provide User Interfaces (UIs) corresponding to various services (for example, call, data transmission, broadcasting, and photography) to the user. The touch screen 190 may transmit an analog signal corresponding to at least one touch on a UI to the touch screen controller 195. The touch screen 190 may receive at least one touch input through a user's body part (e.g. a finger) or a touch input tool (for example, a stylus pen). The touch screen 190 may also receive a touch input signal corresponding to a continuous movement of a touch among one or more touches. The touch screen 190 may transmit an analog signal corresponding to the continuous movement of the input touch to the touch screen controller 195.

As used in this description, 'touch' may include a non-contact touch, and need not be limited to contacts between the touch screen 190 and the user's body part or the touch input tool. A gap detectable to the touch screen 190 may vary according to the capabilities or configuration of the mobile device 100.

The touch screen 190 may be implemented as, for example, a resistive type, a capacitive type, an ElectroMagnetic Resonance (EMR) type, an infrared type, or an acoustic wave type.

The touch screen controller 195 converts an analog signal received from the touch screen 190 to a digital signal (for example, X and Y coordinates). The controller 110 may control the touch screen 190 using the digital signal received from the touch screen controller 195. For example, the controller 110 may control selection or execution of a shortcut icon (not shown) displayed on the touch screen 190 in response to a touch. The touch screen controller 195 may be incorporated into the controller 110.

Figure 2:
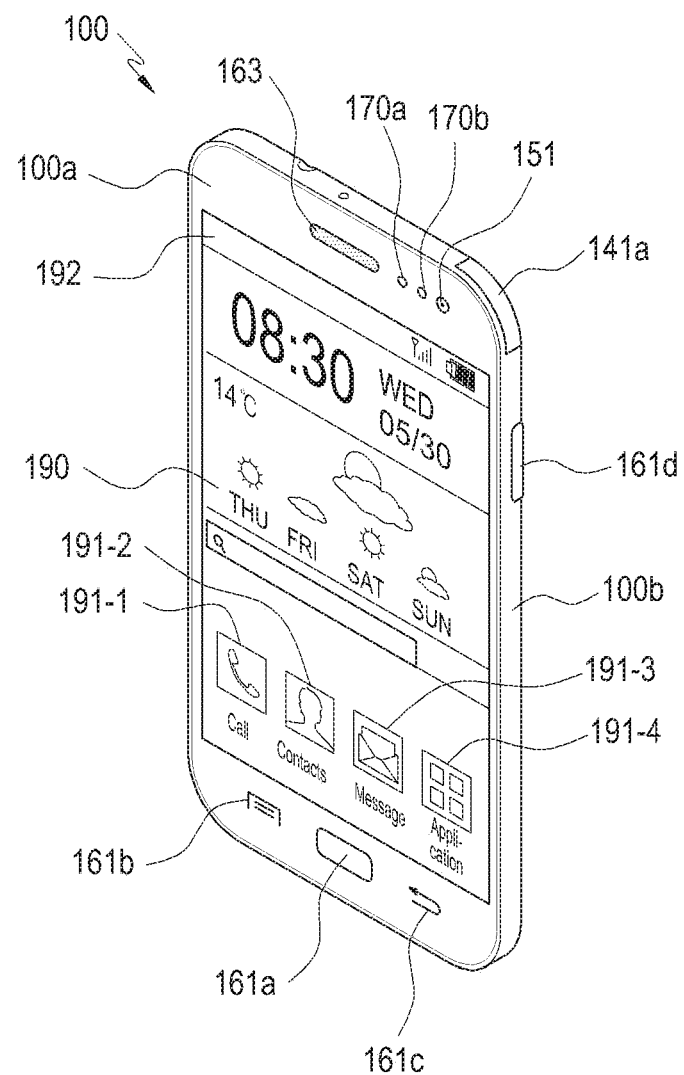
FIG. 2 is a front perspective view of a mobile device according to an exemplary embodiment of the present invention.

FIGS. 2 and 3 are front and rear perspective views, respectively, of a mobile device according to an exemplary embodiment of the present invention.

Referring to FIG. 2, the touch screen 190 is disposed at the center of the front surface 100a of the mobile device 100, occupying almost the entirety of the front surface 100a. In FIG. 2, a main home screen is displayed on the touch screen 190, by way of example. The main home screen is the first screen to be displayed on the touch screen 190, when the mobile device 100 is powered on. In the case where the mobile device 100 has different home screens of a plurality of pages, the main home screen may be the first of the home screens of the plurality of pages. Shortcut icons 191-1, 191-2 and 191-3 for executing frequently used applications, an application switch key 191-4, time, weather, and the like may be displayed on the home screen. The application switch key 191-4 is used to display application icons representing applications on the touch screen 190. A status bar 192 may be displayed at the top of the touch screen 190 in order to indicate states of the mobile device 100 such as a battery charged state, a received signal strength, and a current time.

A home button 161a, a menu button 161b, and a back button 161c may be formed at the bottom of the touch screen 190.

The home button 161a is used to display the main home screen on the touch screen 190. For example, upon pressing (or touching) of the home button 161a while any home screen other than the main home screen or a menu screen is displayed on the touch screen 190, the main home screen may be displayed on the touch screen 190. Upon pressing (or touching) of the home button 161a during execution of applications on the home screen 190, the main home screen illustrated in FIG. 2 may be displayed on the touch screen 190. The home button 161a may also be used to display recently used applications or a task manager on the touch screen 190.

The menu button 161b provides link menus available on the touch screen 190. The link menus may include a widget adding menu, a background changing menu, a search menu, an edit menu, an environment setting menu, and the like. During execution of an application, the menu button 161b may provide a link menu linked to the application.

The back button 161c may display the screen previous to a current screen or end the latest used application.

The first camera 151, an illuminance sensor 170a, and a proximity sensor 170b may be arranged at a corner of the front surface 100a of the mobile device 100, whereas the second camera 152, a flash 153, and the speaker 163 may be arranged on the rear surface 100c of the mobile device 100.

For example, a power/reset button 161d, a volume button 161e, a terrestrial DMB antenna 141a for receiving a broadcast signal, and one or more microphones 162 may be disposed on side surfaces 100b of the mobile device 100.

The DMB antenna 141a may be mounted to the mobile device 100 fixedly or detachably.

The connector 165 is formed on the bottom side surface of the mobile device 100. The connector 165 may include a plurality of electrodes and may be connected to an external device by wire. The earphone connector jack 167 may be formed on the top side surface of the mobile device 100, for allowing an earphone to be inserted.

Figure 4:
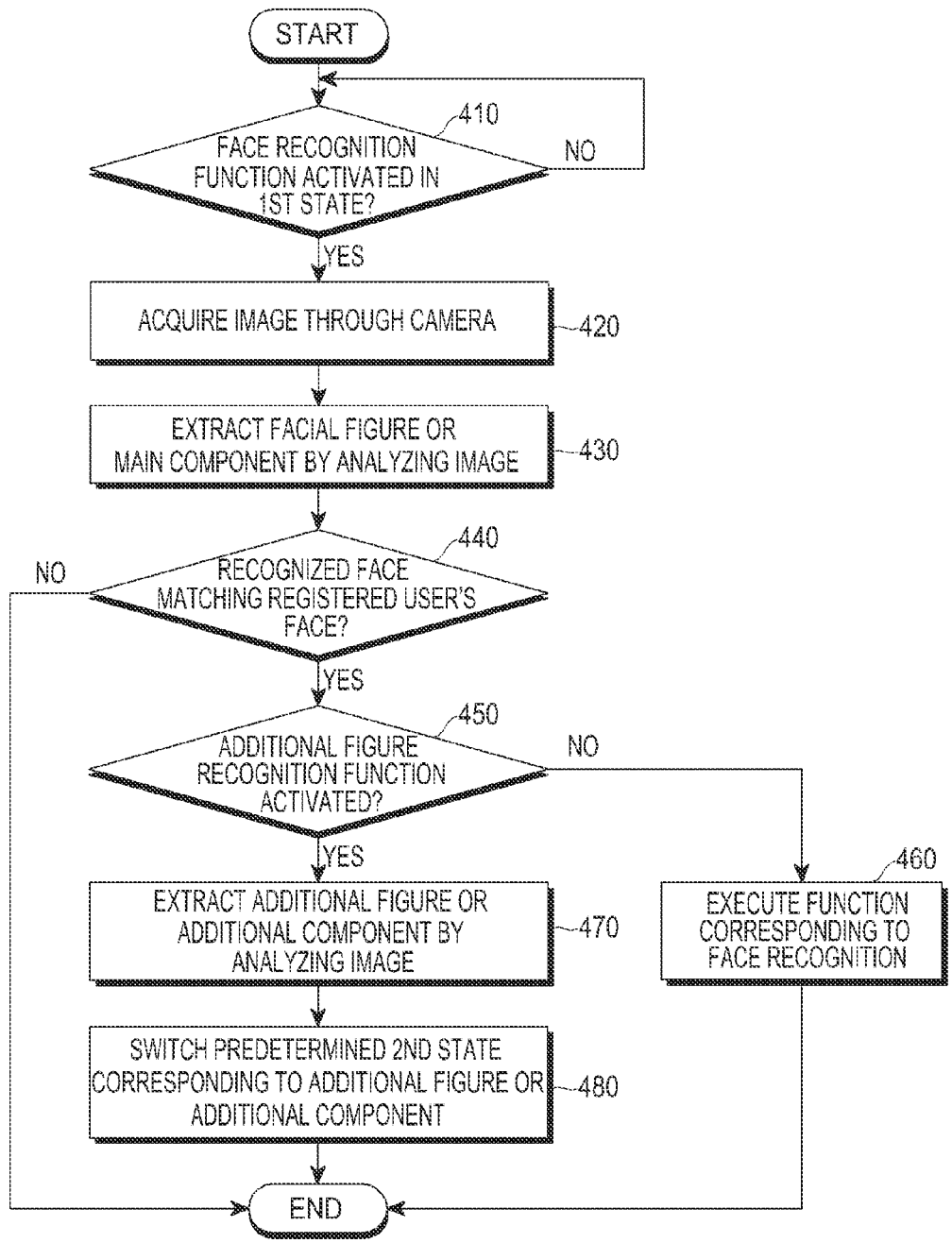
FIG. 4 is a flowchart illustrating a method for controlling a mobile device having a face recognition function using an additional component according to an exemplary embodiment of the present invention.

FIG. 4 is a flowchart illustrating a method for controlling a mobile device having a face recognition function using an additional component according to an exemplary embodiment of the present invention.

Referring to FIG. 4, in the method for controlling a mobile device having a face recognition function using an additional, it is determined whether the face recognition function has been activated in a first state of the mobile device in step 410. The controller 110 of the mobile device 100 determines whether the face recognition function has been activated in the first state. The controller 110 may recognize the first state of the mobile device 100. For example, the controller 110 may recognize states of the mobile device 100 such as a home screen display state, an application list display state, an application execution state, an action execution state, a screen locked state, etc. The display 190 of the mobile device 100 may display a state of the mobile device 100. The display 190 may be configured as a touch screen.

The controller 110 may determine whether the face recognition function has been activated. The face recognition function is a technology of recognizing the face of a mobile user through a camera and providing various User Interfaces (UIs) based on the recognized face. The face recognition function may be active (ON) or inactive (OFF) in the mobile device 100. The controller 110 may determine whether the face recognition function is active or inactive in the mobile device 100. The controller 110 may activate or deactivate the face recognition function by detecting a user input. For example, the controller 110 may display a menu icon for activating the face recognition function or a menu icon for deactivating the face recognition function on the touch screen 190. The controller 110 may activate or deactivate the face recognition function by detecting a touch input on the menu icon for activating the face recognition function or the menu icon for deactivating the face recognition function.

If the face recognition function is active, the controller 110 acquires an image through a camera in step 420. When determining that the face recognition function is active in step 410, the controller 110 acquires an image through the camera. The camera may be one of the first camera 151 and the second camera 152 included in the camera module 150 described above with reference to FIGS. 1-3. The controller 110 may acquire an image by operating the camera and thus capturing the face of the user through the camera.

Figure 5:
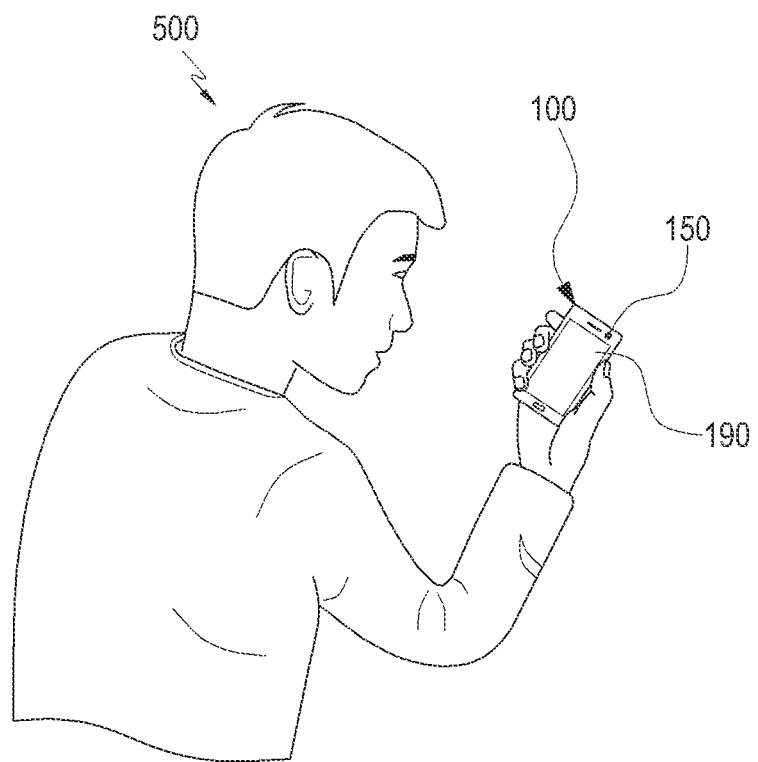
FIG. 5 illustrates a user using a mobile device having a face recognition function by means of an additional component according to an exemplary embodiment of the present invention.

FIG. 5 illustrates a user using a mobile device having a face recognition function using an additional component according to an exemplary embodiment of the present invention.

Referring to FIG. 5, the controller 110 of the mobile device 100 may acquire an image by operating the camera 150 and thus capture the face of a user 500 through the camera 150 and display the captured image on the touch screen 190. The image may include successive images and the successive images may form a video. Alternatively, the image may be a single photo image.

The controller 110 extracts a facial figure or at least one main component included in the facial figure by analyzing the captured image in step 430. The controller 110 extracts the facial figure or at least one main component included in the facial figure by analyzing the image acquired in step 420.

Figure 6:
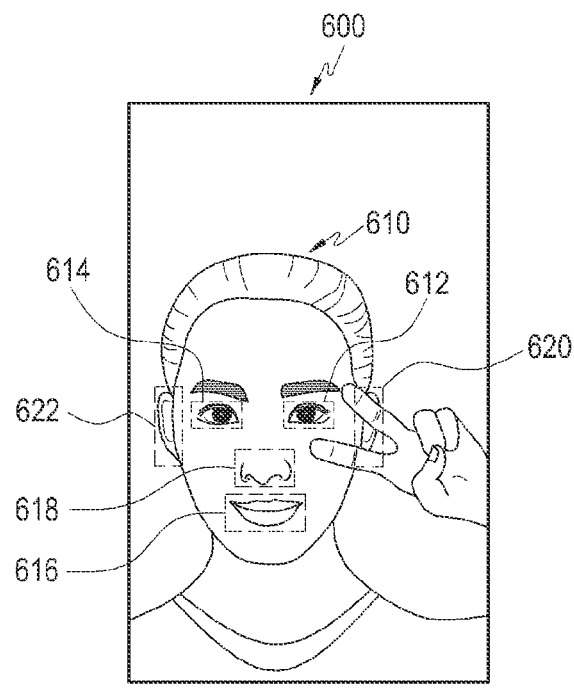
FIG. 6 illustrates extraction of a facial figure or at least one main component included in the facial figure by analyzing an image acquired through a camera according to an exemplary embodiment of the present invention.

FIG. 6 illustrates extraction of a facial figure or at least one main component included in the facial figure by analyzing an image acquired through a camera.

Referring to FIG. 6, an image 600 acquired in step 420 is illustrated. The controller 110 may extract a facial figure 610 by analyzing the image 600. The controller 110 may extract at least one main component included in the facial figure 610 by analyzing the image 600. The at least one main component may include at least one of, for example, the eyes, mouth, nose, and ears of the user. In FIG. 6, the at least one main component may include at least one of eyes 612 and 614, a mouth 616, a nose 618, and ears 620 and 622. Accordingly, the controller 110 may extract the facial figure 610 or the at least one main component including at least one of the eyes 612 and 614, the mouth 616, the nose 618, and the ears 620 and 622 by analyzing the image 600 acquired through the camera.

Referring back to FIG. 4, the controller 110 determines whether a face recognized from the image matches a registered user's face based on the facial figure or the at least one main component in step 440. The controller 110 may determine whether the face recognized from the image matches the registered user's face, using the facial figure or the at least one main component extracted in step 430. For example, the controller 110 may determine whether the face recognized from the image matches the registered user's face by comparing the at least one extracted main component with the registered user's face.

Information about the registered user's face may be pre-stored in the memory 175 of the mobile device 100. For example, the controller 110 may determine whether the face recognized from the image matches the registered user's face by comparing the eyes as the at least one extracted main component with the eyes of the user's face pre-registered in the memory 175. If the extracted facial figure or at least one main component is identical or similar to the pre-registered user's face in terms of size, position, or relative distance, the controller 110 may determine that the face recognized from the image matches the registered user's face. For example, if the sizes of the eyes 612 and 614 as the at least one extracted main component and the distance between the eyes 612 and 614 are equal to or approximate to those of the eyes of the pre-registered user's face in FIG. 6, the controller 110 may determine that the face recognized from the image matches the registered user's face. Alternatively, the controller 110 may determine whether the face recognized from the image matches the registered user's face by comparing the sizes, positions, or relative distances of the eyes 612 and 614, the mouth 616, the nose 618, and the ears 620 and 622 which are the at least one extracted main component with those of the eyes, mouth, nose, and ears of the registered user's face. If the controller 110 determines that the face recognized from the image matches the registered user's face, the controller 110 proceeds to step 450. If the controller 110 determines that the face recognized from the image does not match the registered user's face, the controller 110 ends the procedure.

The controller 110 determines whether an additional figure recognition function has been activated in step 450. The controller 110 may determine whether the additional figure recognition function is active. An additional figure refers to any figure other than a facial figure. The additional figure recognition function is a technology of recognizing an additional figure through a camera and providing various UIs based on the recognized additional figure. The additional figure recognition function may be active (ON) or inactive (OFF) in the mobile device 100. The controller 110 may determine whether the additional figure recognition function is active or inactive in the mobile device 100. The controller 110 may activate or deactivate the additional figure recognition function by detecting a user input. For example, the controller 110 may display a menu icon for activating the additional figure recognition function or a menu icon for deactivating the additional figure recognition function on the touch screen 190. The controller 110 may activate or deactivate the additional figure recognition function by detecting a touch input on the menu icon for activating the additional figure recognition function or the menu icon for deactivating the additional figure recognition function. If the additional figure recognition function is active, the controller 110 may proceed to step 470.

If the additional figure recognition function is inactive, the controller 110 executes a function corresponding to the face recognition in step 460. When the controller 110 determines that the additional figure recognition function is inactive, the controller 110 executes only the function corresponding to the face recognition. The function corresponding to the face recognition may be preset and stored in the memory 175. For example, the function corresponding to the face recognition may be a function of switching the mobile device 100 from a locked state to an unlocked state, if the first state is the locked state. Alternatively, the function corresponding to the face recognition may be a function of executing a predetermined application.

If the additional figure recognition function is active, the controller 110 extracts an additional figure or at least one additional component included in the additional figure by analyzing the acquired image in step 470. When the controller 110 determines that the additional figure recognition function is active in step 450, the controller 110 extracts the additional figure or the at least one additional component included in the additional figure by analyzing the acquired image. Accordingly, the controller 110 extracts the additional figure or the at least one additional component included in the additional figure by analyzing the image acquired in step 420.

Figure 7:
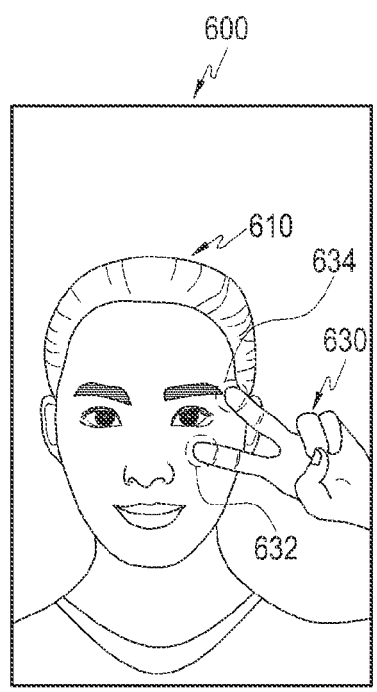
FIG. 7 illustrates extraction of an additional figure or at least one additional component included in the additional figure by analyzing an image acquired through a camera according to an exemplary embodiment of the present invention.

FIG. 7 illustrates extraction of an additional figure or at least one additional component included in the additional figure by analyzing an image acquired through a camera according to an exemplary embodiment of the present invention.

Referring to FIG. 7, the image 600 acquired in step 420 is illustrated. The controller 110 may extract an additional figure 630 by analyzing the image 600. For example, the additional figure 630 may be a hand. The controller 110 may extract at least one additional component included in the additional figure 630 by analyzing the image 600. For example, the at least one additional component may be a finger. In FIG. 7, the at least one additional component may be one or more fingers 632 and 634. Accordingly, the controller 110 may extract the additional figure 630 such as a hand or the at least one additional component 632 and 634 such as fingers by analyzing the image 600 acquired through the camera. In this manner, exemplary embodiments of the present invention advantageously provide a mobile device for extracting an additional figure or an additional component by analyzing an image acquired through a camera and a method for controlling the mobile device.

Referring back to FIG. 4, the controller 110 switches the mobile device to a predetermined second state corresponding to the additional figure or the at least one additional component in step 480. The controller 110 may switch the mobile device 100 to the predetermined second state corresponding to the additional figure or the at least one additional component that has been extracted in step 470. The predetermined second state corresponding to the additional figure or the at least one additional component may be pre-stored in the memory 175. The second state corresponding to the additional figure or the at least one additional component may be stored in the memory 175 as initially set based on a detected user input or as changed later. The predetermined second state may be one of a home screen display state, an application list display state, an application execution state, an action execution state, and a screen locked state of the mobile terminal 100. For example, the at least one extracted additional component may be a finger and the predetermined second state corresponding to the at least one additional component being the finger may be the application list display state. Accordingly, if the at least one extracted additional component is a finger, the controller 110 may switch the mobile device 100 to the predetermined second state corresponding to the finger as the at least one additional component, that is, the application list display state. Therefore, exemplary embodiments of the present invention advantageously provide a mobile device for switching to a predetermined state corresponding to an additional figure or an additional component and a method for controlling the mobile device.

Figure 8:
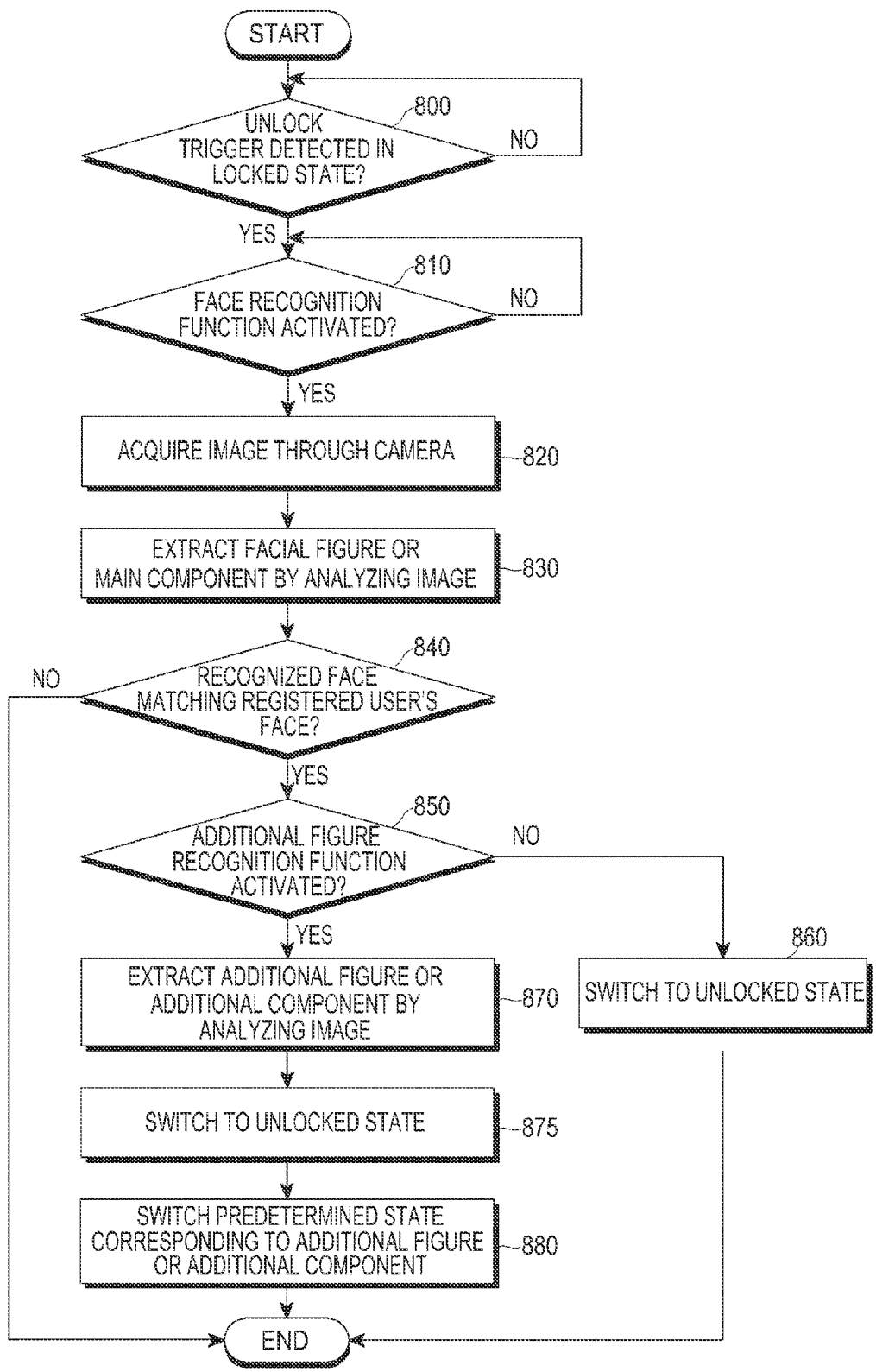
FIG. 8 is a flowchart illustrating a method for controlling a mobile device having a face recognition function using an additional component according to an exemplary embodiment of the present invention.

FIG. 8 is a flowchart illustrating a method for controlling a mobile device having a face recognition function using an additional component according to an exemplary embodiment of the present invention.

Referring to FIG. 8, in the method for controlling the mobile device having a face recognition function using an additional component, the controller 110 detects an unlock trigger in a locked state in step 800.

Figure 9A:
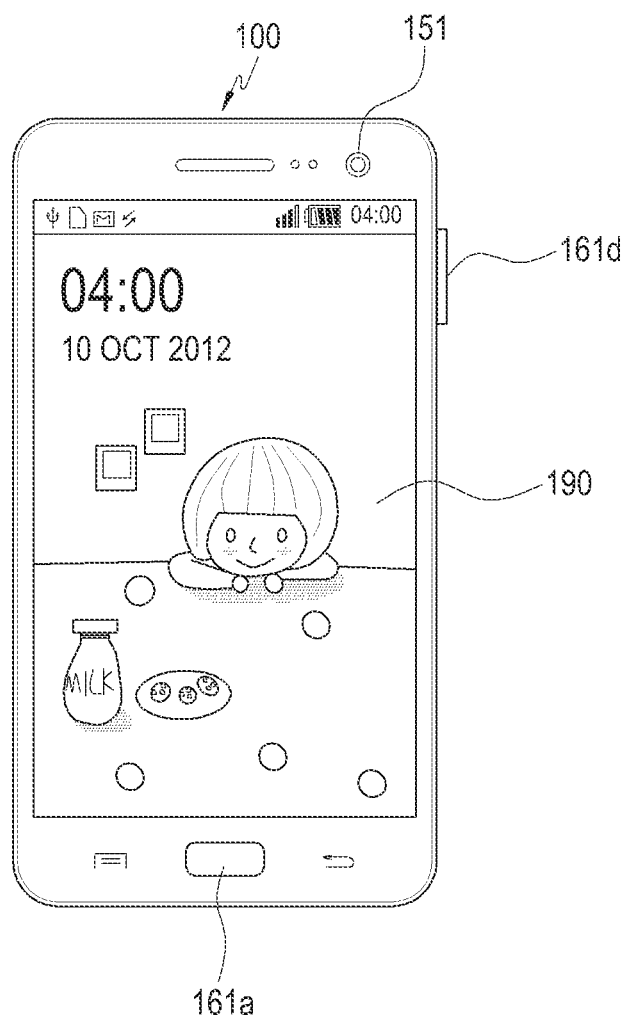
FIG. 9A illustrates a mobile device placed in a locked state according to an exemplary embodiment of the present invention.

FIG. 9A illustrates a mobile device placed in a locked state according to an exemplary embodiment of the present invention.

Referring to FIG. 9A, the locked state refers to a state in which an input for a user's unintended operation is blocked. For example, if the mobile device 100 is put in the user's pocket, the user does not want to operate the mobile device 100. If the mobile device 100 is placed in the locked state, an input for the user's unintended operation may be blocked. In addition, the locked state may prevent an unauthorized person from operating the mobile device 100. If the mobile device 100 is in the locked state, the unauthorized person is prevented from applying an input to the mobile device 100. For example, if no input is applied to the mobile device 100 for a predetermined time, the mobile device 100 may be switched to the locked state. Upon pressing of a predetermined button, the mobile device 100 may also be switched to the locked state. The predetermined button may be, for example, the power/reset button 161*d*. When the mobile device 100 is in the locked state, a predetermined input may be rejected. For example, the predetermined input may be an input to the touch screen 190. However, a function other than the predetermined input may be executed in the mobile device 100. For example, a music application may be executed even in the locked state.

The controller 110 may detect an unlock trigger in the locked state. The unlock trigger may be an input of a predetermined button, for example. The predetermined button may be the power/reset button 161*d* or the home button 161*a*, as illustrated in FIG. 9A. Upon detection of the unlock trigger, the controller 110 may turn on the touch screen 190. The touch screen 190 may be turned on and a screen may be displayed on the touch screen 190.

Referring back to FIG. 8, upon detection of the unlock trigger, the controller 110 proceeds to step 810 to determine whether the face recognition function is active. In step 810, the controller 110 determines whether the face recognition function is active. The controller 110 may determine whether the face recognition function has been activated. The face recognition function may be active (ON) or inactive (OFF) in the mobile device 100. The controller 110 may determine whether the face recognition function is active or inactive in the mobile device 100.

If the face recognition function is active, the controller 110 acquires an image through a camera in step 820. When the controller 110 determines that the face recognition function is active in step 810, the controller 110 acquires an image through the camera. The camera may be one of the first camera 151 and the second camera 152 included in the camera module 150 described before with reference to FIGS. 1 to 3. The controller 110 may acquire an image by operating the camera and thus capturing the face of the user through the camera.

The controller 110 extracts a facial figure or at least one main component included in the facial figure by analyzing the captured image in step 830. The controller 110 extracts the facial figure or at least one main component included in the facial figure by analyzing the image that has been acquired in step 820.

Figure 9B:
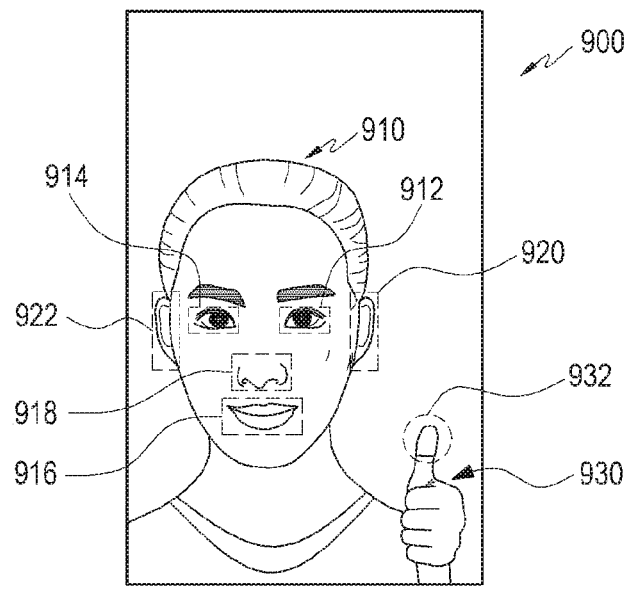
FIG. 9B illustrates extraction of a facial figure or at least one main component included in the facial figure and an additional figure or at least one additional component included in the additional figure by analyzing an image acquired through a camera according to an exemplary embodiment of the present invention.

FIG. 9B illustrates extraction of a facial figure or at least one main component included in the facial figure by analyzing an image acquired through a camera according to an exemplary embodiment of the present invention.

Referring to FIG. 9B, an image 900 acquired in step 820 is illustrated. The controller 110 may extract a facial figure 910 by analyzing the image 900. The controller 110 may extract at least one main component included in the facial figure 910 by analyzing the image 900. The at least one main component may include at least one of, for example, the eyes, mouth, nose, and ears of the user. In FIG. 9B, the at least one main component may include at least one of eyes 912 and 914, a mouth 916, a nose 918, and ears 920 and 922. Accordingly, the controller 110 may extract the facial figure 910 or the at least one main component including at least one of the eyes 912 and 914, the mouth 916, the nose 918, and the ears 920 and 922 by analyzing the image 900 acquired through the camera.

Referring back to FIG. 8, the controller 110 determines whether a face recognized from the image matches a registered user's face based on the facial figure or the at least one main component in step 840. The controller 110 may determine whether the face recognized from the image matches the registered user's face, using the facial figure or the at least one main component that has been extracted in step 830. For example, the controller 110 may determine whether the face recognized from the image matches the registered user's face by comparing the extracted facial figure or at least one extracted main component with the registered user's face.

Information about the registered user's face may be pre-stored in the memory 175 of the mobile device 100. If the extracted facial figure or at least one main component is identical or similar to the pre-registered user's face in terms of size, position, or relative distance, the controller 110 may determine that the face recognized from the image matches the registered user's face. If the controller 110 determines that the face recognized from the image matches the registered user's face, the controller 110 proceeds to step 850. If the controller determines that the face recognized from the image does not match the registered user's face, the controller 110 ends the procedure.

The controller 110 determines whether an additional figure recognition function has been activated in step 850. The controller 110 may determine whether the additional figure recognition function is active. An additional figure refers to any figure other than a facial figure. The additional figure recognition function is a technology of recognizing an additional figure through a camera and providing various UIs based on the recognized additional figure. Herein, the additional figure recognition function may be active (ON) or inactive (OFF) in the mobile device 100. The controller 110 may determine whether the additional figure recognition function may be active or inactive in the mobile device 100. The controller 110 may activate or deactivate the additional figure recognition function by detecting a user input. If the additional figure recognition function is active, the controller 110 may proceed to step 870.

If the additional figure recognition function is inactive, the controller 110 switches the mobile device 100 to an unlocked state in step 860. When the controller 110 determines that the additional figure recognition function is inactive, the controller 110 only switches the mobile device 100 to the unlocked state. Accordingly, if the controller 110 determines that the additional figure recognition function is inactive, the controller 110 does not perform an operation for extracting an additional figure or an additional component and thus switches the mobile device 100 to a preset state corresponding to the additional component. Since the unlock trigger is detected in step 800 and the facial figure extracted by the face recognition function matches the registered user's face in step 840, the controller 110 only switches the mobile device 100 to the unlocked state.

Figure 9C:
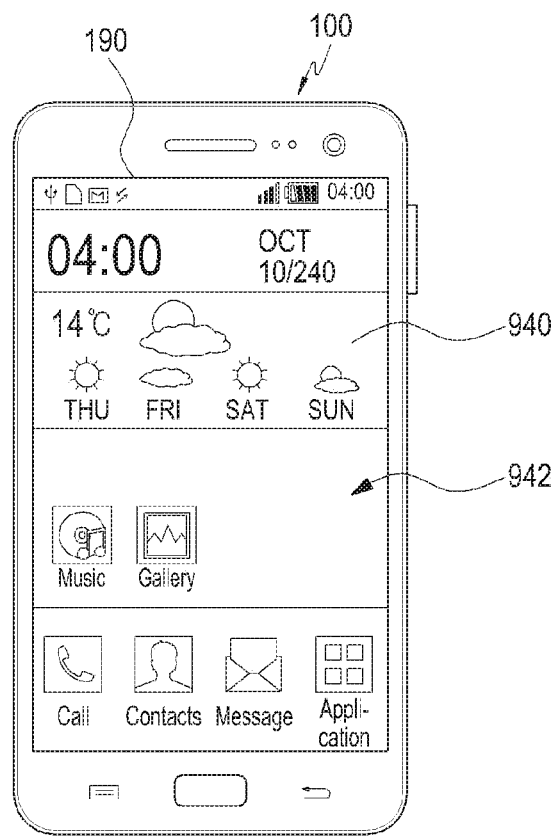
FIG. 9C illustrates a mobile device placed in an unlocked state according to an exemplary embodiment of the present invention.

FIG. 9C illustrates a mobile device placed in an unlocked state according to an exemplary embodiment of the present invention.

Referring to FIG. 9C, when the mobile device 100 is in the unlocked state, the mobile device 100 may receive most user input. Accordingly, the mobile device 100 may receive most input to the buttons 161 or the touch screen 190 in the unlocked state. For example, a home screen 940 may be displayed on the touch screen 190 in the unlocked state. Shortcut icons 942 or widgets may further be displayed on the home screen 940.

If the additional figure recognition function is active, the controller 110 extracts an additional figure or at least one additional component included in the additional figure by analyzing the acquired image in step 870. When the controller 110 determines that the additional figure recognition function is active in step 850, the controller 110 extracts the additional figure or the at least one additional component included in the additional figure by analyzing the acquired image. Accordingly, the controller 110 extracts the additional figure or the at least one additional component included in the additional figure by analyzing the image that has been acquired in step 820.

FIG. 9B also illustrates extraction of an additional figure or at least one additional component included in the additional figure by analyzing an image acquired through a camera. In FIG. 9B, the image 900 acquired in step 820 is illustrated. The controller 110 may extract an additional figure 930 by analyzing the image 900. For example, the additional figure 930 may a hand. The controller 110 may extract at least one additional component included in the additional figure 930 by analyzing the image 900. Similarly, the at least one additional component may include a thumb, an index finger, a middle finger, a ring finger, or a little finger. In FIG. 9B, the at least one additional component may be a thumb 932. Accordingly, exemplary embodiments of the present invention advantageously provide a mobile device for extracting an additional figure or an additional component by analyzing an image acquired through a camera and a method for controlling the mobile device.

Referring back to FIG. 8, the controller 110 switches to the unlocked state in step 875. The controller 110 switches the mobile device 100 to a predetermined state corresponding to the additional figure or the at least one additional component in step 880. The controller 110 may switch the mobile device 100 to the predetermined state corresponding to the additional figure or the at least one additional component that has been extracted in step 870. The predetermined state corresponding to the extracted additional figure or at least one additional component may be pre-stored in the memory 175. For example, the at least one extracted additional component may be a thumb and the predetermined state corresponding to the at least one additional component being the thumb may be a music application execution state. Accordingly, if the at least one extracted additional component is a thumb, the controller 110 may switch the mobile device 100 to the predetermined state corresponding to the thumb as the at least one additional component, that is, the music application execution state.

Figure 9D:
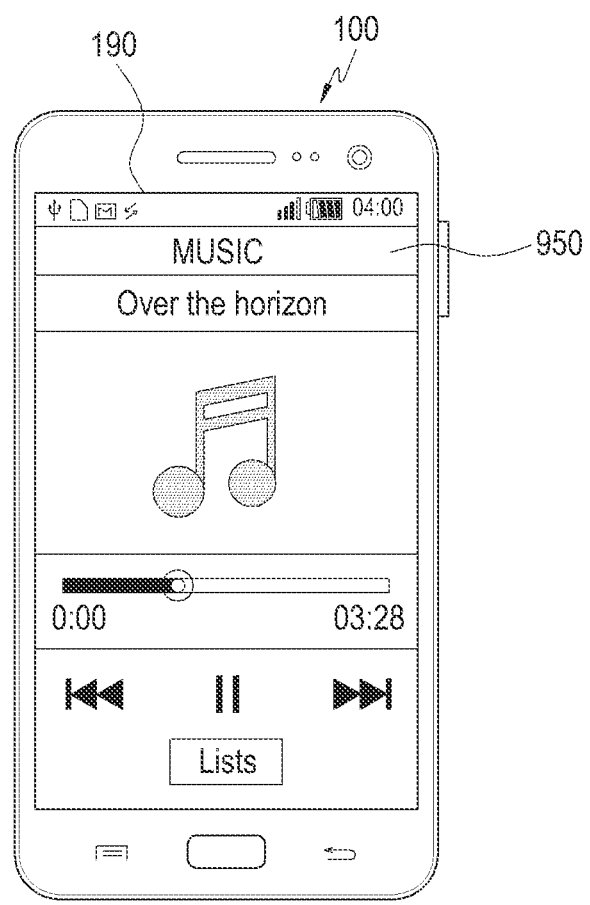
FIG. 9D illustrates execution of a music application in a mobile device according to an exemplary embodiment of the present invention.

FIG. 9D illustrates execution of a music application in a mobile device according to an exemplary embodiment of the present invention.

Referring to FIG. 9D, the controller 110 switches the mobile device 100 to a predetermined state corresponding to an additional component being a thumb (i.e., a state of executing a music application 950). Accordingly, exemplary embodiments of the present invention advantageously provide a mobile device for switching to a predetermined state corresponding to an additional figure or an additional component and a method for controlling the mobile device.

Figure 10:
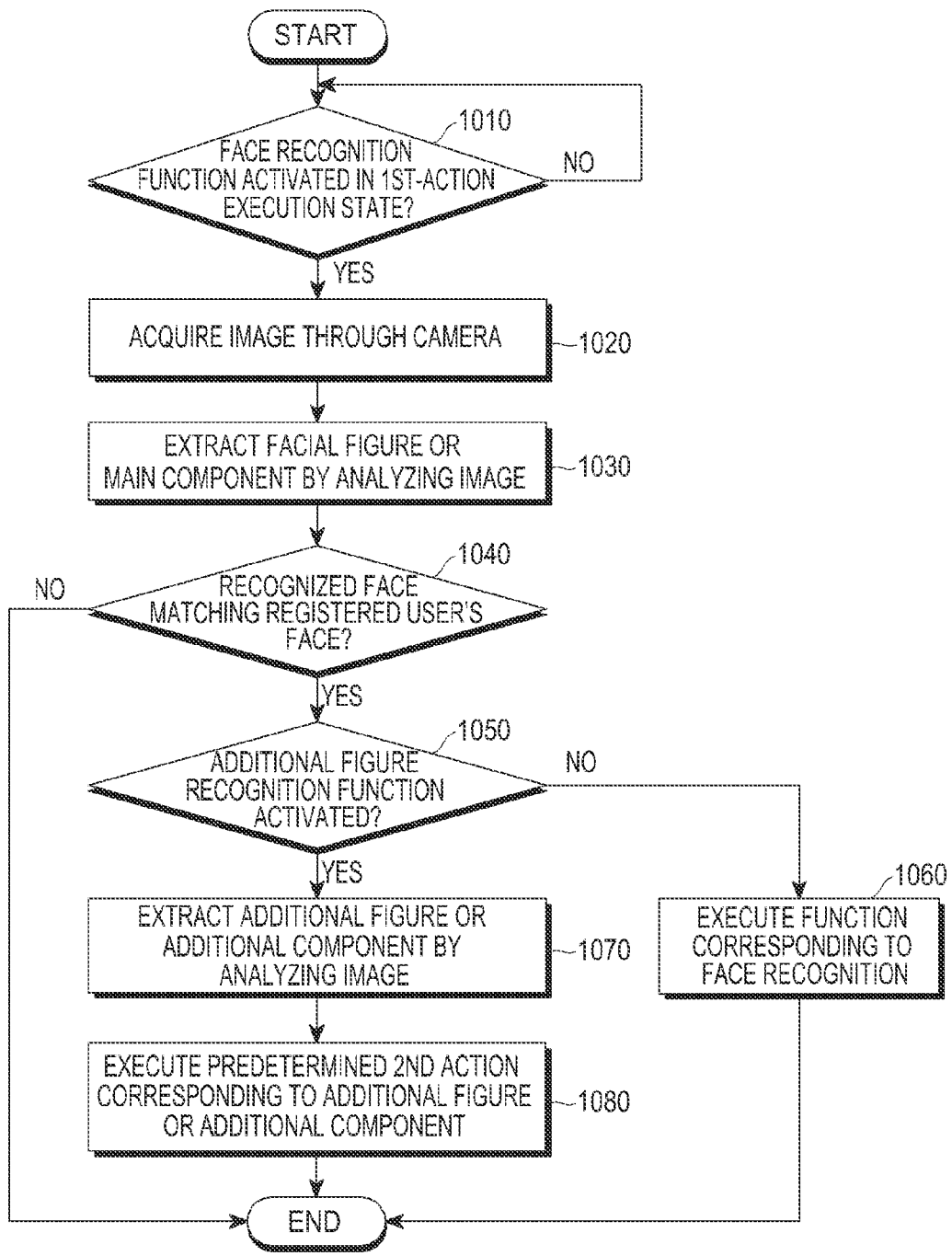
FIG. 10 is a flowchart illustrating a method for controlling a mobile device having a face recognition function using an additional component according to an exemplary embodiment of the present invention.

FIG. 10 is a flowchart illustrating a method for controlling a mobile device having a face recognition function using an additional component according to an exemplary embodiment of the present invention.

Referring to FIG. 10, in the method for controlling the mobile device having a face recognition function using an additional component, it is determined whether the face recognition function has been activated in a first-action execution state in the mobile device in step 1010. The controller 110 determines whether the face recognition function has been activated in the first-action execution state. The controller 110 may recognize the first-action execution state of the mobile device 100. For example, the first-action execution state may be a locked state, a first-application execution state, or a state of executing a specific item in the first application.

Figure 11A:
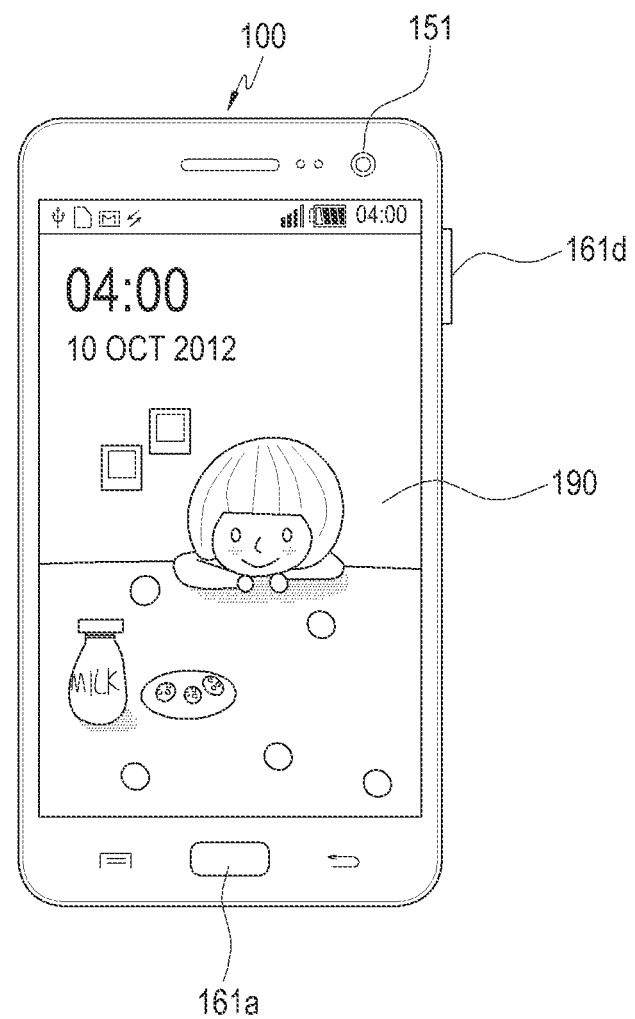
FIG. 11A illustrates a mobile device placed in a locked state according to an exemplary embodiment of the present invention.

FIG. 11A illustrates a mobile device placed in a locked state according to an exemplary embodiment of the present invention.

Referring to FIG. 11A, the first-action execution state is shown as the locked state. The controller 110 may determine whether the face recognition function has been activated. The face recognition function is a technology of recognizing the face of a mobile user through a camera and providing various UIs based on the recognized face. The face recognition function may be active (ON) or inactive (OFF) in the mobile device 100. The controller 110 may determine whether the face recognition function is active or inactive in the mobile device 100.

Referring back to FIG. 10, if the face recognition function is active, the controller 110 acquires an image through a camera in step 1020. When the controller 110 determines that the face recognition function is active in step 1010, the controller 110 acquires an image through the camera. The camera may be one of the first camera 151 and the second camera 152 included in the camera module 150 described before with reference to FIGS. 1-3. The controller 110 may acquire an image by operating the camera and thus capturing the face of the user through the camera.

The controller 110 extracts a facial figure or at least one main component included in the facial figure by analyzing the captured image in step 1030. The controller 110 extracts the facial figure or the at least one main component included in the facial figure by analyzing the image that has been acquired in step 1020.

Figure 11B:
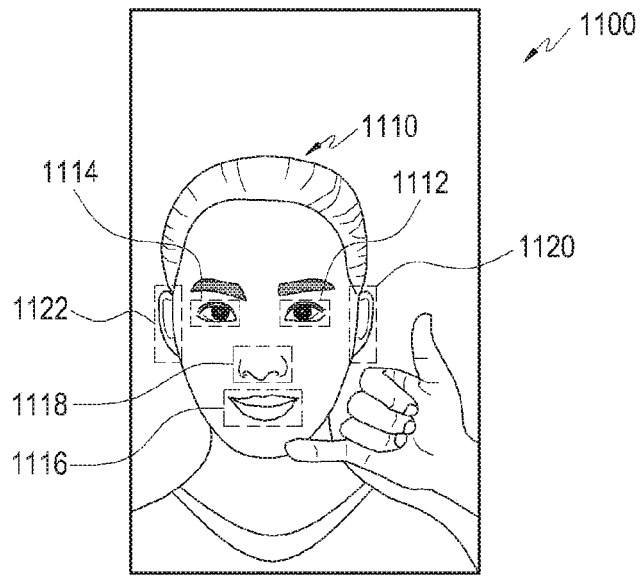
FIG. 11B illustrates extraction of a facial figure or at least one main component included in the facial figure by analyzing an image acquired through a camera according to an exemplary embodiment of the present invention.

FIG. 11B illustrates extraction of a facial figure or at least one main component included in the facial figure by analyzing an image acquired through a camera according to an exemplary embodiment of the present invention.

Referring to FIG. 11B, an image 1100 acquired in step 1020 is illustrated. The controller 110 may extract a facial figure 1110 by analyzing the image 1100. The controller 110 may extract at least one main component included in the facial figure 1110 by analyzing the image 1100. The at least one main component may include at least one of, for example, the eyes, mouth, nose, and ears of the user. In FIG. 11B, the at least one main component may include at least one of eyes 1112 and 1114, a mouth 1116, a nose 1118, and ears 1120 and 1122. Accordingly, the controller 110 may extract the facial figure 1110 or the at least one main component including at least one of the eyes 1112 and 1114, the mouth 1116, the nose 1118, and the ears 1120 and 1122 by analyzing the image 1100 acquired through the camera.

Referring back to FIG. 10, the controller 110 determines whether a face recognized from the image matches a registered user's face based on the facial figure or the at least one main component in step 1040. The controller 110 may determine whether the face recognized from the image matches the registered user's face, using the facial figure or the at least one main component that has been extracted in step 1030. For example, the controller 110 may determine whether the face recognized from the image matches the registered user's face by comparing the extracted facial figure or at least one main component with the registered user's face. Information about the registered user's face may be pre-stored in the memory 175 of the mobile device 100. If the extracted facial figure or at least one main component is identical or similar to the pre-registered user's face in terms of size, position, or relative distance, the controller 110 may determine that the face recognized from the image matches the registered user's face. If the controller 110 determines that the face recognized from the image matches the registered user's face, the controller 110 proceeds to step 1050. If the controller 110 determines that the face recognized from the image does not match the registered user's face, the controller 110 ends the procedure.

The controller 110 determines whether an additional figure recognition function has been activated in step 1050. The controller 110 may determine whether the additional figure recognition function is active. An additional figure refers to any figure other than a facial figure. The additional figure recognition function is a technology of recognizing an additional figure through a camera and providing various UIs based on the recognized additional figure. The additional figure recognition function may be active (ON) or inactive (OFF) in the mobile device 100. The controller 110 may determine whether the additional figure recognition function is active or inactive in the mobile device 100. The controller 110 may activate or deactivate the additional figure recognition function by detecting a user input. If the additional figure recognition function is active, the controller 110 may proceed to step 1070.

If the additional figure recognition function is inactive, the controller 110 executes a function corresponding to the face recognition in step 1060. When the controller 110 determines that the additional figure recognition function is inactive, the controller 110 executes only the function corresponding to the face recognition. The function corresponding to the face recognition may be preset and stored in the memory 175. For example, if the first-action execution state is the locked state, the function corresponding to the face recognition may be a function of switching the mobile device 100 to the unlocked state.

Figure 11C:
FIG. 11C illustrates a mobile device placed in an unlocked state according to an exemplary embodiment of the present invention.

FIG. 11C illustrates the mobile device placed in the unlocked state according to another exemplary embodiment of the present invention.

Referring to FIG. 11C, the function corresponding to the face recognition may be a function of switching the mobile device to the unlocked state. Alternatively, the function corresponding to the face recognition may be a function of executing a predetermined application.

If the additional figure recognition function is active, the controller 110 extracts an additional figure or at least one additional component included in the additional figure by analyzing the acquired image in step 1070. When determining that the additional figure recognition function is active in step 1050, the controller 110 extracts the additional figure or the at least one additional component included in the additional figure by analyzing the acquired image. Accordingly, the controller 110 extracts the additional figure or the at least one additional component included in the additional figure by analyzing the image that has been acquired in step 1020.

Figure 11D:
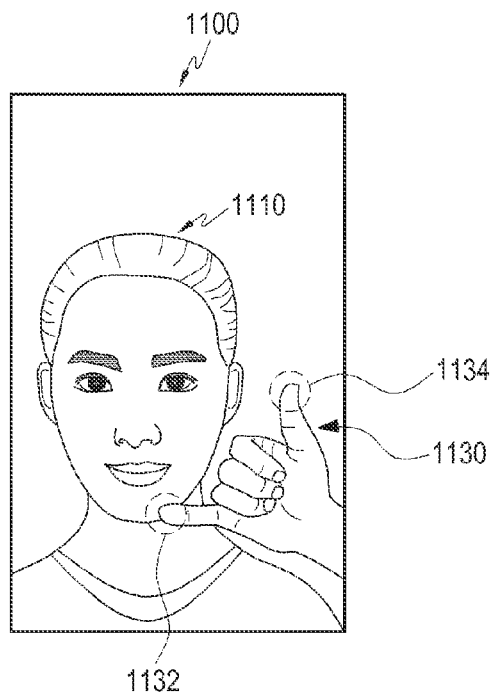
FIG. 11D illustrates extraction of an additional figure or at least one additional component included in the additional figure by analyzing an image acquired through a camera according to an exemplary embodiment of the present invention.

FIG. 11D illustrates extraction of an additional figure or at least one additional component included in the additional figure by analyzing an image acquired through a camera according to an exemplary embodiment of the present invention.

Referring to FIG. 11D, the image 1100 acquired in step 1020 is illustrated. The controller 110 may extract an additional figure 1130 by analyzing the image 1100. For example, the additional figure 1130 may a hand. The controller 110 may extract at least one additional component included in the additional figure 1130 by analyzing the image 1100. For example, the at least one additional component may be a finger. In addition, the at least one additional component may include a thumb, an index finger, a middle finger, a ring finger, or a little finger. In FIG. 11D, the at least one additional component may include a thumb 1134 and a little finger 1132. In this manner, exemplary embodiments of the present invention advantageously provide a mobile device for extracting an additional figure or an additional component by analyzing an image acquired through a camera and a method for controlling the mobile device.

Referring back to FIG. 10, the controller 110 switches the mobile device 100 to a predetermined second-action execution state corresponding to the additional figure or the at least one additional component in step 1080. The controller 110 may switch the mobile device 100 to the predetermined second-action execution state corresponding to the additional figure or the at least one additional component that has been extracted in step 1070. The predetermined second-action execution state may be different from the first-action execution state. Alternatively, the second-action execution state may be a state of executing a function additional to the first action. For example, the second-action execution state may be the locked state, a second-application execution state, or a state of executing a specific item in the second application.

The second-action execution state corresponding to the additional figure or the at least one additional component may be pre-stored in the memory 175. For example, the at least one extracted additional component may include a thumb and a little finger and the predetermined second-action execution state corresponding to the thumb and the little finger as the additional components may be a phone application execution state. Accordingly, if the at least one extracted additional component is the thumb and the little finger, the controller 110 may switch the mobile device 100 to the predetermined second-action execution state corresponding to the thumb and the little finger as the at least one extracted additional component, that is, the phone application execution state.

Figure 11E:
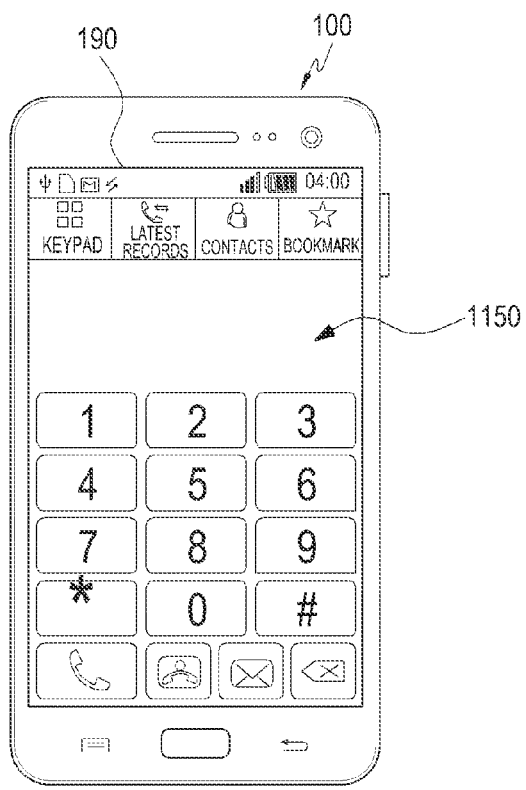
FIG. 11E illustrates execution of a phone application in a mobile device according to another exemplary embodiment of the present invention.

FIG. 11E illustrates execution of a phone application in a mobile device according to an exemplary embodiment of the present invention.

Referring to FIG. 11E, the controller 110 switches the mobile device 100 to the state of executing a phone application 1150 preset as the second-action execution state corresponding to the thumb and the little finger as the at least one additional component. Therefore, the exemplary embodiment of the present invention advantageously provides a mobile device for switching to a predetermined second-action execution state corresponding to an additional figure or an additional component and a method for controlling the mobile device.

Figure 12:
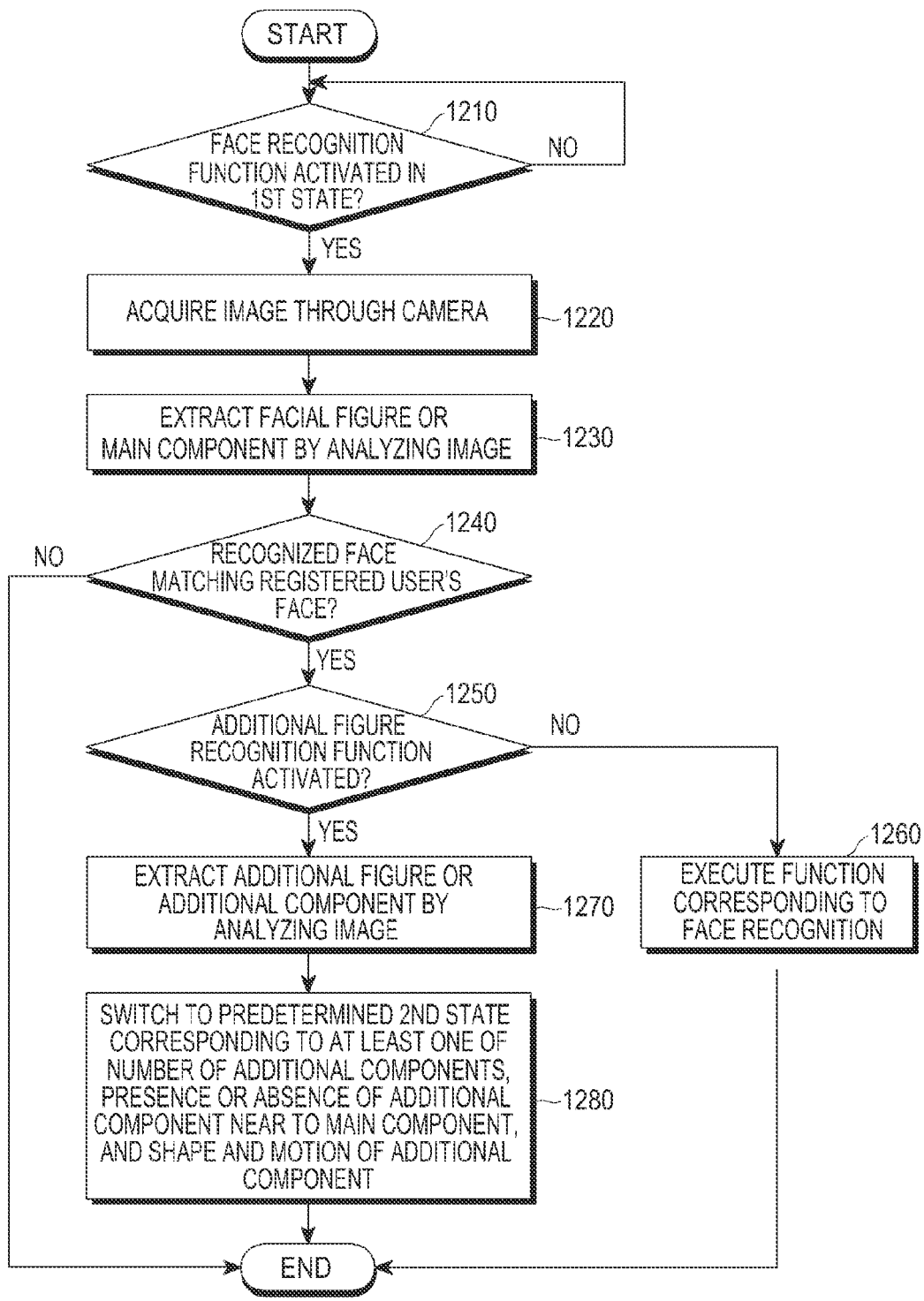
FIG. 12 is a flowchart illustrating a method for controlling a mobile device having a face recognition function using an additional component according to an exemplary embodiment of the present invention.

FIG. 12 is a flowchart illustrating a method for controlling a mobile device having a face recognition function using an additional component according to an exemplary embodiment of the present invention.

Referring to FIG. 12, in the method for controlling the mobile device having a face recognition function using an additional component according to another exemplary embodiment of the present invention, it is determined whether the face recognition function has been activated in a first state of the mobile device in step 1210. The controller 110 determines whether the face recognition function has been activated in the first state. The controller 110 may recognize the first state of the mobile device 100. For example, the controller 110 may recognize a home screen display state, an application list display state, an application execution state, an action execution state, and a screen locked state. For example, the first state of the mobile device 100 may be the locked state.

Figure 13A:
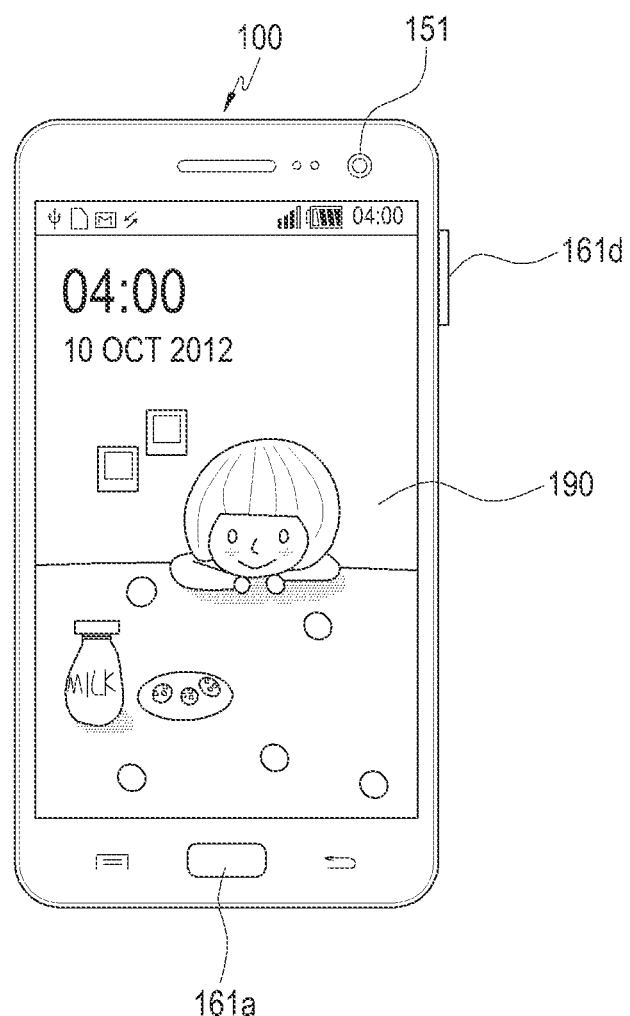
FIG. 13A illustrates a mobile device placed in a locked state according to an exemplary embodiment of the present invention.

FIG. 13A illustrates a mobile device placed in the locked state according to an exemplary embodiment of the present invention.

Referring to FIG. 13A, the first state is shown as the locked state. The controller 110 may determine whether the face recognition function has been activated. The face recognition function may be active (ON) or inactive (OFF) in the mobile device 100. The controller 110 may determine whether the face recognition function is active or inactive in the mobile device 100.

If the face recognition function is active, the controller 110 acquires an image through a camera in step 1220. When the controller 110 determines that the face recognition function is active in step 1210, the controller 110 acquires an image through the camera. The camera may be one of the first camera 151 and the second camera 152 included in the camera module 150 described above with reference to FIGS. 1 to 3. The controller 110 may acquire an image by operating the camera and thus capturing the face of the user through the camera.

The controller 110 extracts a facial figure or at least one main component included in the facial figure by analyzing the captured image in step 1230. The controller 110 extracts the facial figure or at least one main component included in the facial figure by analyzing the image that has been acquired in step 1220.

Figure 13B:
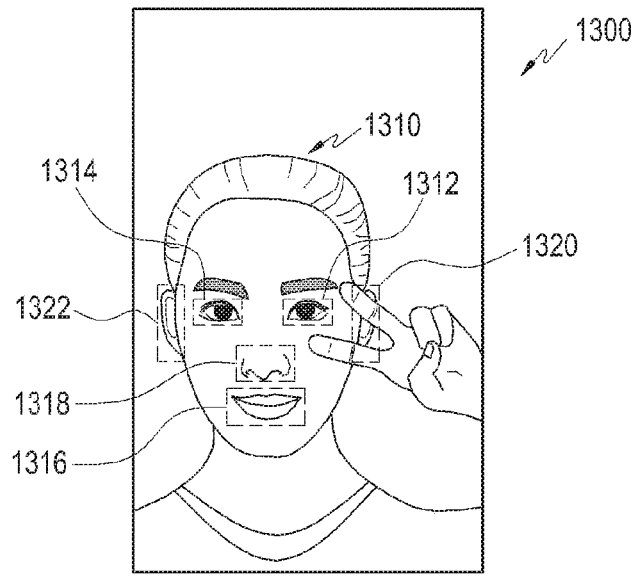
FIG. 13B illustrates extraction of a facial figure or at least one main component included in the facial figure by analyzing an image acquired through a camera according to an exemplary embodiment of the present invention.

FIG. 13B illustrates extraction of a facial figure or at least one main component included in the facial figure by analyzing an image acquired through a camera according to an exemplary embodiment of the present invention.

Referring to FIG. 13B, an image 1300 acquired in step 1220 is illustrated. The controller 110 may extract a facial figure 1310 by analyzing the image 1300. The controller 110 may extract at least one main component included in the facial figure 1310 by analyzing the image 1300. The at least one main component may include at least one of, for example, the eyes, mouth, nose, and ears. In FIG. 13B, the at least one main component may include at least one of eyes 1312 and 1314, a mouth 1316, a nose 1318, and ears 1320 and 1322. Accordingly, the controller 110 may extract the facial figure 1310 or the at least one main component including at least one of the eyes 1312 and 1314, the mouth 1316, the nose 1318, and the ears 1320 and 1322 by analyzing the image 1300 acquired through the camera.

Referring back to FIG. 12, the controller 110 determines whether a face recognized from the image matches a registered user's face based on the facial figure or the at least one main component in step 1240. The controller 110 may determine whether the face recognized from the image matches the registered user's face, using the facial figure or the at least one main component that has been extracted in step 1230. For example, the controller 110 may determine whether the face recognized from the image matches the registered user's face by comparing the extracted facial figure or at least one main component with the registered user's face.

Information about the registered user's face may be pre-stored in the memory 175 of the mobile device 100. If the extracted facial figure or at least one main component is identical or similar to the pre-registered user's face in terms of size, position, or relative distance, the controller 110 may determine that the face recognized from the image matches the registered user's face. If the controller 110 that the face recognized from the image matches the registered user's face, the controller 110 proceeds to step 1250. If the controller 110 determines that the face recognized from the image does not match the registered user's face, the controller 110 ends the procedure.

The controller 110 determines whether an additional figure recognition function has been activated in step 1250. The controller 110 may determine whether the additional figure recognition function is active. An additional figure refers to any figure other than a facial figure. The additional figure recognition function is a technology of recognizing an additional figure through a camera and providing various UIs based on the recognized additional figure. The additional figure recognition function may be active (ON) or inactive (OFF) in the mobile device 100. The controller 110 may determine whether the additional figure recognition function may be active or inactive in the mobile device 100. The controller 110 may activate or deactivate the additional figure recognition function by detecting a user input. If the additional figure recognition function is active, the controller 110 may proceed to step 1270.

If the additional figure recognition function is inactive, the controller 110 executes a function corresponding to the face recognition in step 1260. When the controller 110 determines that the additional figure recognition function is inactive, the controller 110 executes only the function corresponding to the face recognition. The function corresponding to the face recognition may be preset and stored in the memory 175.

Figure 13C:
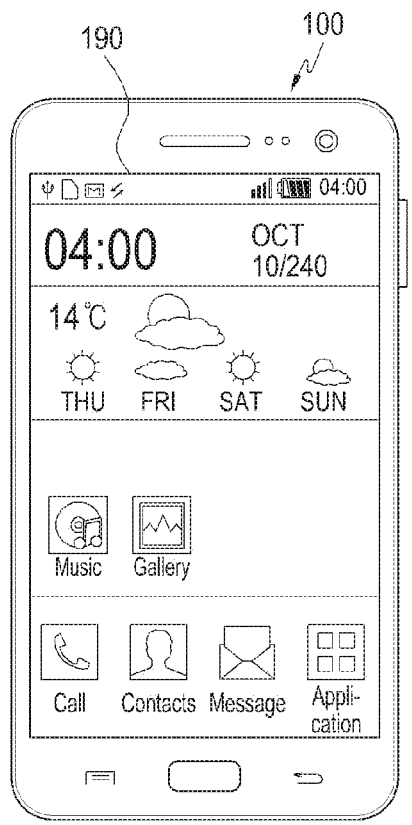
FIG. 13C illustrates a mobile device placed in an unlocked state according to another exemplary embodiment of the present invention.

FIG. 13C illustrates a mobile device is placed in the unlocked state according to another exemplary embodiment of the present invention.

Referring to FIG. 13C, if the first state is the locked state, the function corresponding to the face recognition may be a function of changing the mobile device 100 to the unlocked state. Alternatively, the function corresponding to the face recognition may be a function of executing a predetermined application, for example.

If the additional figure recognition function is active, the controller 110 extracts an additional figure or at least one additional component included in the additional figure by analyzing the acquired image in step 1270. When the controller 110 determines that the additional figure recognition function is active in step 1250, the controller 110 extracts the additional figure or the at least one additional component included in the additional figure by analyzing the acquired image. Accordingly, the controller 110 extracts the additional figure or the at least one additional component included in the additional figure by analyzing the image that has been acquired in step 1220.

Figure 13D:
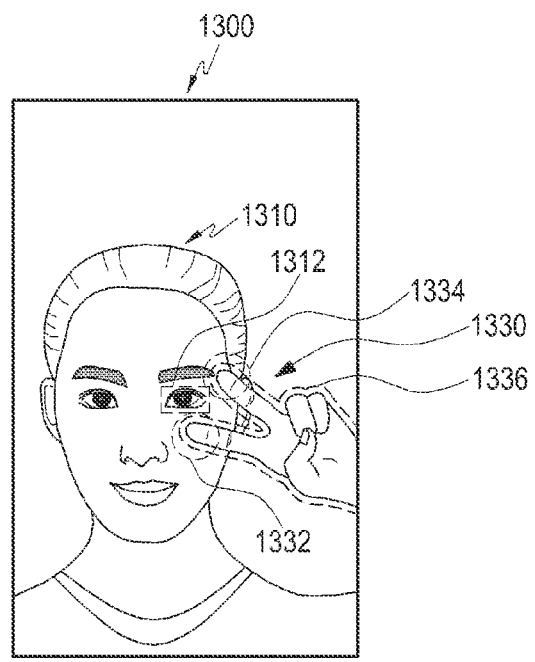
FIG. 13D illustrates setting of a predetermined second state corresponding to a number of at least one extracted additional component, the presence or absence of at least one additional component positioned in the vicinity of at least one extracted main component, and a shape of an extracted additional figure or a shape of the at least one extracted additional component according to an exemplary embodiment of the present invention.

FIG. 13D illustrates extraction of an additional figure or at least one additional component included in the additional figure by analyzing an image acquired through a camera according to an exemplary embodiment of the present invention.

Referring to FIG. 13D, the image 1300 acquired in step 1220 is illustrated. The controller 110 may extract an additional figure 1330 by analyzing the image 1300. For example, the additional figure 1330 may a hand. The controller 110 may extract at least one additional component included in the additional figure 1330 by analyzing the image 1300. For example, the at least one additional component may be a finger. In addition, the at least one additional component may include a thumb, an index finger, a middle finger, a ring finger, or a little finger. For example, as illustrated in FIG. 13D, the at least one additional component may include an index finger 1332 and a middle finger 1334. In this manner, exemplary embodiments of the present invention advantageously provide a mobile device for extracting an additional figure or an additional component by analyzing an image acquired through a camera and a method for controlling the mobile device.

Referring back to FIG. 12, the controller 110 switches the mobile device 100 to a predetermined second state corresponding to at least one of the number of the at least additional component, at least one additional component positioned in a predetermined area near to the at least one extracted main component, the shape of the extracted additional figure or at least one additional component, and a motion of the at least one extracted additional component in step 1280. The controller 110 may switch the mobile device 100 to the predetermined state corresponding to at least one of the number of the at least additional component extracted in step 1270, the at least one additional component positioned in the predetermined area near to the at least one extracted main component, the shape of the extracted additional figure or at least one additional component, and the motion of the at least one extracted additional component. The preset state may be pre-stored in the memory 175.

The controller 110 may switch the mobile device 100 to a predetermined second state corresponding to the number of the at least one extracted additional component. For example, the at least one extracted additional component may include fingers and the number of the at least one extracted component may be 2. The predetermined second state corresponding to the two fingers as the at least one additional component may be a camera application execution state. Accordingly, if the at least one extracted additional component is two fingers, the controller 110 may switch the mobile device 100 to the predetermined second state corresponding to the two fingers (i.e., the camera application execution state).

FIG. 13D illustrates setting of a predetermined second state corresponding to the number of at least one extracted additional component. In the example of FIG. 13D, the additional figure and at least one additional component extracted in step 1270 are a hand and fingers, respectively. The fingers are the index finger 1332 and the middle finger 1334. The number of the at least one additional component is 2. Therefore, the controller 110 may execute the camera application as the predetermined second state corresponding to the number of the at least one additional component, 2 in FIG. 13D.

Figure 13E:
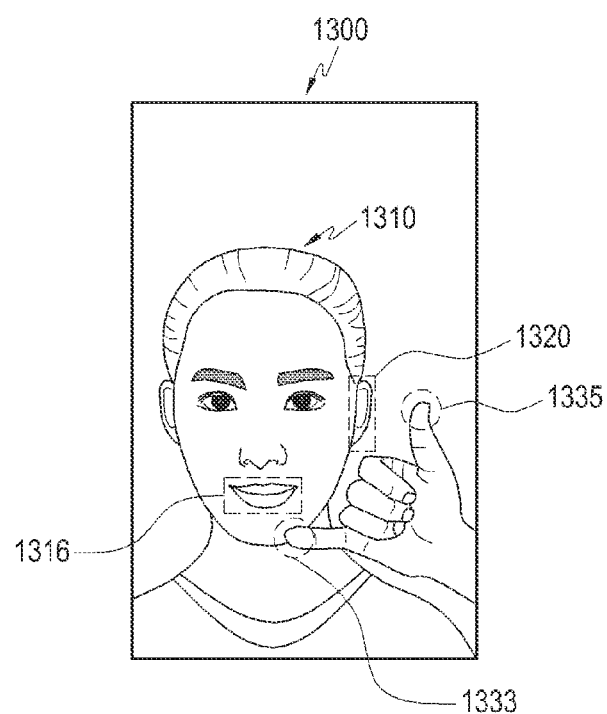
FIG. 13E illustrates setting of a predetermined second state corresponding to at least one additional component positioned in the vicinity of at least one extracted main component according to an exemplary embodiment of the present invention.
Figure 13F:
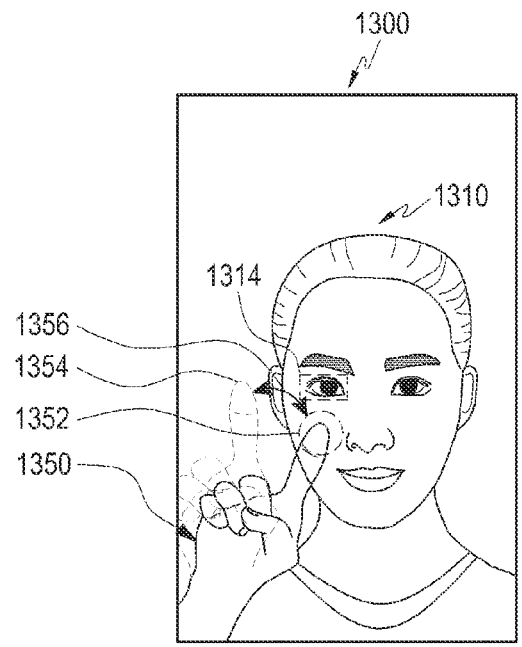
FIG. 13F illustrates setting of a predetermined second state corresponding to a motion of at least one extracted additional component according to an exemplary embodiment of the present invention.
Figure 13G:
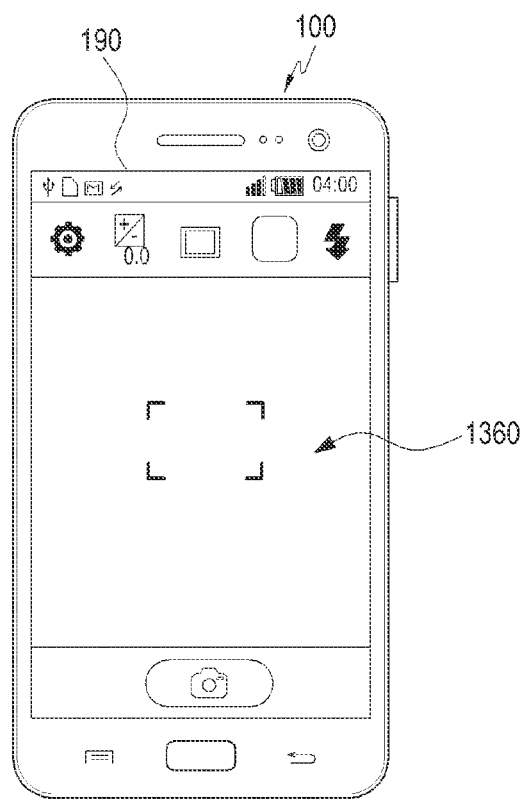
FIG. 13G illustrates execution of a camera application in a mobile device according to an exemplary embodiment of the present invention.

FIG. 13G illustrates execution of the camera application in a mobile device according to an exemplary embodiment of the present invention.

Referring to FIG. 13G, the controller 110 is shown in FIG. 13G as executing a camera application 1360 as the predetermined second state corresponding to the number of the at least one additional component. Accordingly, the exemplary embodiment of the present invention advantageously provides a mobile device for switching to a preset state corresponding to the number of at least one additional component and a method for controlling the mobile device.

The controller 110 may switch the mobile device 100 to a predetermined second state corresponding to at least one additional component extracted from a predetermined area near to at least one extracted main component. For example, the at least one extracted main component may be a left eye. The predetermined area near to the at least one main component may be within a predetermined distance from the left eye. The at least one additional component may include an index finger and a middle finger. For example, the at least one additional component extracted from the predetermined area near to the at least one extracted main component may be the index finger and the middle finger within the predetermined distance from the left eye. The predetermined second state corresponding to the index finger and the middle finger within the predetermined distance from the left eye may be a camera application execution state. Accordingly, if the at least one additional component extracted from the predetermined area near to the at least one extracted main component is the index finger and the middle finger within the predetermined distance from the left eye, the controller 110 may switch to the camera application execution state as the predetermined second state corresponding to the index finger and the middle finger within the predetermined distance from the left eye.

FIG. 13D also illustrates setting of a predetermined second state corresponding to at least one extracted additional component positioned in a predetermined area near to at least one extracted main component. In the example of FIG. 13D, the additional figure and at least one additional component extracted in step 1270 are a hand and fingers, respectively. The fingers are the index finger 1332 and the middle finger 1334. The at least one additional component in the predetermined area near to the at least one extracted main component are the index finger 1332 and the middle finger 1334 within a predetermined distance from the left eye 1312. Accordingly, the controller 110 may execute the camera application as the predetermined second state corresponding to the index finger 1332 and the middle finger 1334 positioned within the predetermined distance from the left eye 1312.

FIG. 13G illustrates execution of the camera application in the mobile device. The controller 110 is shown in FIG. 13G as executing the camera application as the predetermined second state corresponding to the index finger 1332 and the middle finger 1334 positioned within the predetermined distance from the left eye 1312. Accordingly, exemplary embodiments of the present invention advantageously provide a mobile device for switching to a preset state corresponding to at least one extracted additional component positioned in a predetermined area near to at least one extracted main component and a method for controlling the mobile device.

The controller 110 may switch the mobile device 100 to a predetermined second state corresponding to the shape of the extracted additional figure or at least one additional component. For example, the extracted additional figure may be a hand and the at least one extracted additional component may include an index finger and a middle finger. The shape of the extracted additional figure may be a hand shape and the shape of the at least one extracted additional component may include the shapes of an index finger and a middle finger. The predetermined second state corresponding to the hand shape or the index and middle finger shapes may be a camera application execution state. Accordingly, if the shape of the extracted additional figure is a hand shape or the shape of the at least one extracted additional component may include the shapes of an index finger and a middle finger, the controller 110 may switch the mobile device 100 to the camera application execution state as the predetermined second state corresponding to the hand shape or the index and middle finger shapes.

FIG. 13D also illustrates execution of a predetermined second state corresponding to the shape of an extracted additional figure or the shape of at least one additional component. The additional figure extracted in step 1270 is a hand and the at least one additional component includes the index finger 1332 and the middle finger 1334. The shape of the extracted additional figure is a hand shape 1336 and the shape of the at least one additional component includes the shapes of the index finger 1332 and the middle finger 1334. Accordingly, the controller 110 may execute the camera application as the predetermined second state corresponding to the hand shape or the index and middle finger shapes in the example of FIG. 13D.

FIG. 13G also illustrates execution of the camera application in the mobile device. The controller 110 is shown in FIG. 13G as executing the camera application as the predetermined second state corresponding to the hand shape of the extracted additional figure or the index and middle finger shapes of the at least one additional component. Accordingly, exemplary embodiments of the present invention advantageously provides a mobile device for switching to a preset state corresponding to the shape of an extracted additional figure or the shape of at least one extracted additional component and a method for controlling the mobile device.

The controller 110 may switch the mobile device 100 to a predetermined second state corresponding to at least one extracted additional component positioned in a predetermined area near to at least one extracted main component. For example, the extracted at least one main component may be a left ear and a mouth and the predetermined area near to the at least one main component may be an area within a predetermined distance of each of the left ear and the mouth. The at least one additional component may include a thumb and a little finger. Accordingly, the at least one additional component extracted from a predetermined area near to the extracted at least one main component may be, for example, a thumb within a predetermined distance from the left ear and a little finger within a predetermined distance from the mouth. A predetermined second state corresponding to the thumb within the predetermined distance from the left ear and the little finger within the predetermined distance from the mouth may be a phone application execution state. Accordingly, if the at least one additional component extracted from the predetermined area near to the at least one main component is the thumb within the predetermined distance of the left ear and the little finger within the predetermined distance from the mouth, the controller 110 may switch the mobile device 100 to the phone application execution state as the predetermined second state corresponding to the thumb within the predetermined distance from the left ear and the little finger within the predetermined distance from the mouth.

FIG. 13E illustrates setting of a predetermined second state corresponding to at least one extracted additional component positioned in a predetermined area near to at least one extracted main component according to an exemplary embodiment of the present invention.

Referring to FIG. 13E, the additional figure extracted in step 1270 is a hand and the at least one extracted additional component includes a thumb 1335 and a little finger 1333. At least one additional component extracted from a predetermined area near to at least one extracted main component includes the thumb 1335 within a predetermined distance from the left ear 1320 and the little finger 1333 within a predetermined distance from the mouth 1316. Accordingly, the controller 110 may execute the phone application as the predetermined second state corresponding to the thumb 1335 within the predetermined distance from the left ear 1320 and the little finger 1333 within the predetermined distance from the mouth 1316 in the example of FIG. 13E.

Figure 13H:
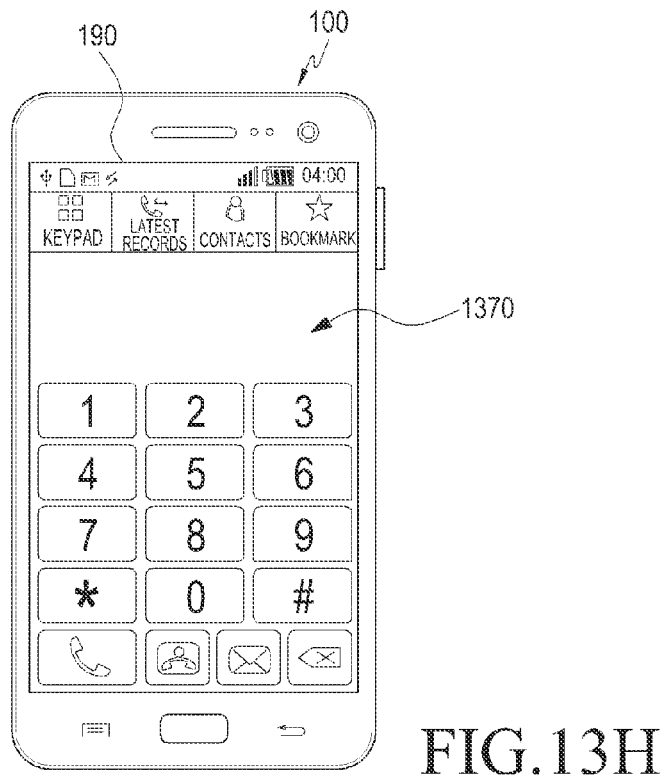
FIG. 13H illustrates execution of a phone application in a mobile device according to an exemplary embodiment of the present invention.

FIG. 13H illustrates execution of the phone application in the mobile device according to an exemplary embodiment of the present invention.

Referring to FIG. 13H, the controller 110 is shown as executing a phone application 1370 as the predetermined second state corresponding to the thumb 1335 within the predetermined distance from the left ear 1320 and the little finger 1333 within the predetermined distance from the mouth 1316. Accordingly, exemplary embodiments of the present invention advantageously provide a mobile device for switching to a preset state corresponding to at least one additional component in a predetermined area near to at least one extracted main component and a method for controlling the mobile device.

The controller 110 may switch the mobile device 100 to a predetermined second state corresponding to a motion of the least one additional component. For example, the at least one extracted additional component may be a finger and a motion of the at least one extracted additional component may be a sideways reciprocating movement for a predetermined distance. The predetermined second state corresponding to the sideways reciprocating movement of the at least one additional component for the predetermined distance may be a message application execution state. Accordingly, if the motion of the at least one extracted additional component is a sideways reciprocating movement for a predetermined distance, the controller 110 may switch the mobile device 100 to the message application execution state as the predetermined second state corresponding to the sideways reciprocating movement of the at least one additional component for the predetermined distance. The controller 110 may switch the mobile device 100 to a predetermined second state corresponding to at least one additional component near to the at least one extracted main component. For example, the at least one extracted component may be a finger and a motion of the at least one additional component in the vicinity of the at least one extracted additional component may be a sideways reciprocating movement for a predetermined distance in the vicinity of the at least one extracted main component.

FIG. 13F illustrates setting of a predetermined second state corresponding to a motion of at least one extracted additional component according to an exemplary embodiment of the present invention.

Referring to FIG. 13F, the additional figure extracted in step 1270 is a hand 1350 and the at least one additional component is an index finger 1352. The motion of the extracted at least one additional component is a reciprocating movement 1356 from left 1352 to right 1354 for a predetermined distance. Accordingly, the controller 110 may execute the message application as the predetermined second state corresponding to the motion of the at least one extracted additional component, which is a sideways reciprocating movement in the example of FIG. 13F.

Figure 13I:
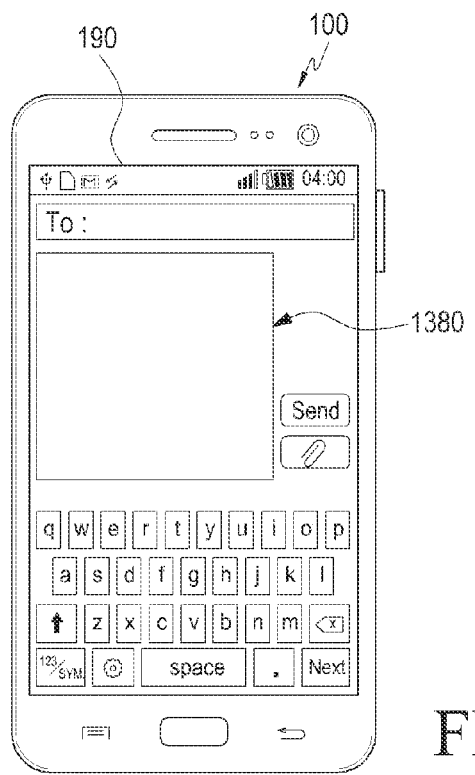
FIG. 13I illustrates execution of a message application in a mobile device according to an exemplary embodiment of the present invention.

FIG. 13I illustrates execution of a message application in a mobile device according to an exemplary embodiment of the present invention.

Referring to FIG. 13I, the controller 110 is shown as executing the message application 1380 as the predetermined second state corresponding to the motion of the at least one additional component, which is a sideways reciprocating movement for a predetermined distance. In addition, the controller 110 may switch the mobile device 100 to a predetermined second state corresponding to a motion of at least one additional component in the vicinity of at least one extracted main component.

Referring to FIG. 13F again, the controller 110 may execute the message application as the predetermined second state corresponding to the reciprocating movement 1356 of the index finger 1352 as the at least one additional component from left 1352 to right 1356 for a predetermined distance in the vicinity of the right eye 1314 as the at least one main component. Accordingly, exemplary embodiments of the present invention advantageously provides a mobile device for switching to a predetermined corresponding to a motion of an at least one extracted additional component and a method for controlling the mobile device.

Figure 14:
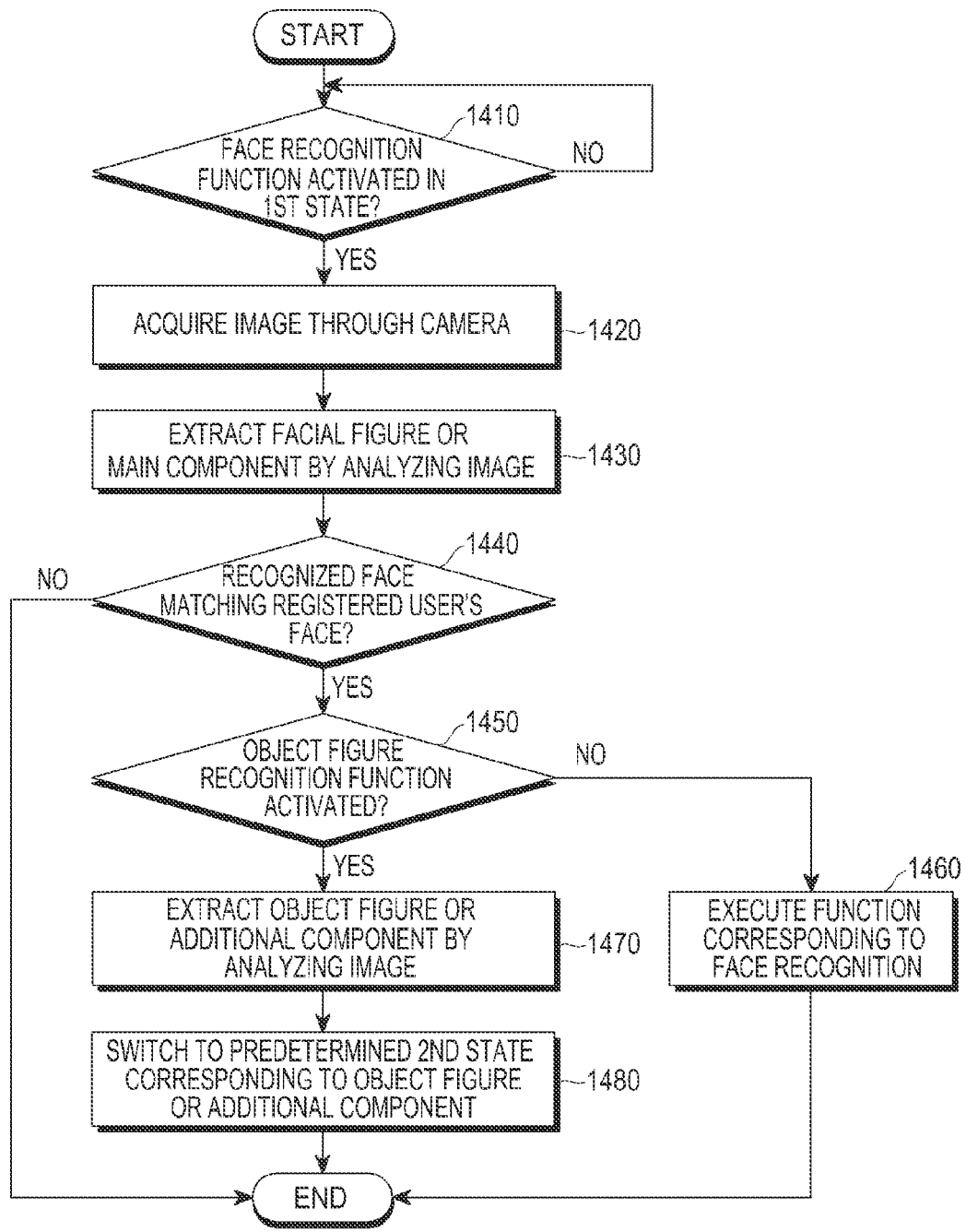
FIG. 14 is a flowchart illustrating a method for controlling a mobile device having a face recognition function using an additional component according to an exemplary embodiment of the present invention.

FIG. 14 is a flowchart illustrating a method for controlling a mobile device having a face recognition function using an additional component according to an exemplary embodiment of the present invention.

Referring to FIG. 14, in the method for controlling a mobile device having a face recognition function using an additional component, it is determined whether the face recognition function has been activated in a first state in the mobile device in step 1410. The controller 110 determines whether the face recognition function has been activated in the first state. The controller 110 may recognize the first state of the mobile device 100. For example, the controller 110 may recognize states of the mobile device 100 such as a home screen display state, an application list display state, an application execution state, an action execution state, a screen locked state, etc. For example, the first state of the mobile device 100 may be a locked state.

Figure 15A:
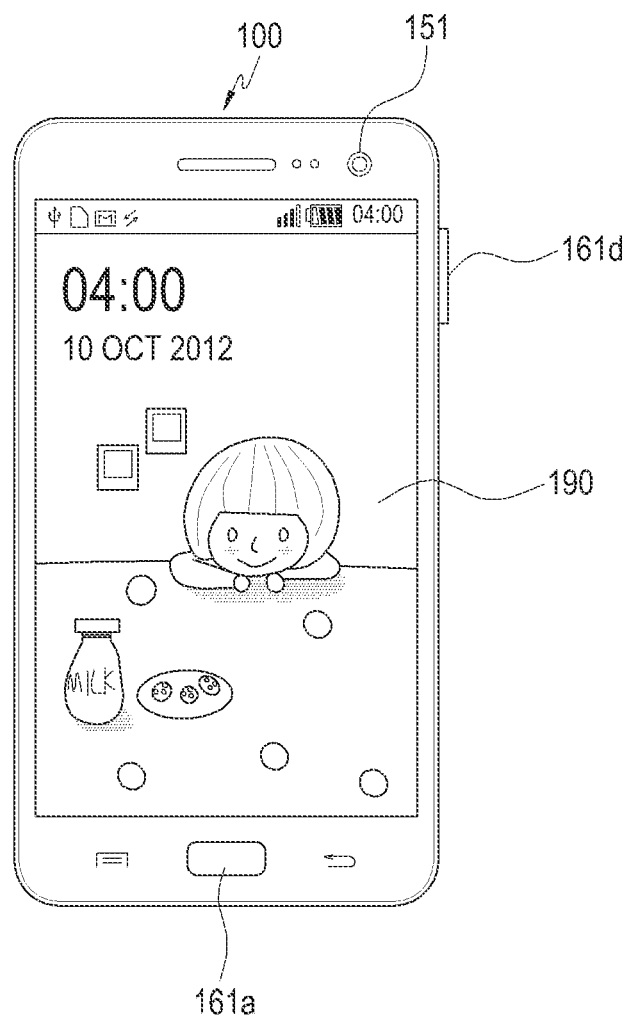
FIG. 15A illustrates a mobile device placed in a locked state according to an exemplary embodiment of the present invention.

FIG. 15A illustrates a mobile device placed in the locked state according to an exemplary embodiment of the present invention.

Referring to FIG. 15A, the mobile device is locked. The controller 110 may determine whether the face recognition function has been activated. The face recognition function may be active (ON) or inactive (OFF) in the mobile device 100. The controller 110 may determine whether the face recognition function is active or inactive in the mobile device 100.

If the face recognition function is active, the controller 110 acquires an image through a camera in step 1420. When the controller 110 determines that the face recognition function is active in step 1410, the controller 110 acquires an image through the camera. The camera may be one of the first camera 151 and the second camera 152 included in the camera module 150 described above with reference to FIGS. 1-3. The controller 110 may acquire an image by operating the camera and thus capturing the face of the user through the camera.

The controller 110 extracts a facial figure or at least one main component included in the facial figure by analyzing the captured image in step 1430. The controller 110 extracts the facial figure or the at least one main component included in the facial figure by analyzing the image that has been acquired in step 1420.

Figure 15B:
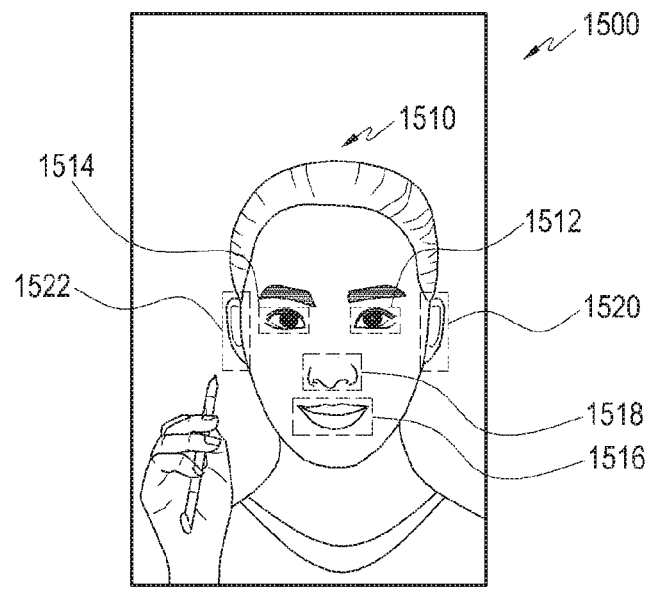
FIG. 15B illustrates extraction of a facial figure or at least one main component included in the facial figure by analyzing an image acquired through a camera according to an exemplary embodiment of the present invention.

FIG. 15B illustrates extraction of a facial figure or at least one main component included in the facial figure by analyzing an image acquired through a camera according to an exemplary embodiment of the present invention.

Referring to FIG. 15B, an image 1500 acquired in step 1420 is illustrated. The controller 110 may extract a facial figure 1510 by analyzing the image 1500. The controller 110 may extract at least one main component included in the facial figure 1510 by analyzing the image 1500. The at least one main component may include at least one of, for example, the eyes, mouth, nose, and ears. In FIG. 15B, the at least one main component may include at least one of eyes 1512 and 1514, a mouth 1516, a nose 1518, and ears 1520 and 1522. Accordingly, the controller 110 may extract the facial figure 1510 or the at least one main component including at least one of the eyes 1512 and 1514, the mouth 15115, the nose 1518, and the ears 1520 and 1522 by analyzing the image 1500 acquired through the camera.

Referring back to FIG. 14, the controller 110 determines whether a face recognized from the image matches a registered user's face based on the facial figure or the at least one main component in step 1440. The controller 110 may determine whether the face recognized from the image matches the registered user's face, using the facial figure or the at least one main component extracted in step 1430. For example, the controller 110 may determine whether the face recognized from the image matches the registered user's face by comparing the extracted facial figure or at least one main component with the registered user's face.

Information about the registered user's face may be pre-stored in the memory 175 of the mobile device 100. If the extracted facial figure or the at least one main component is identical or similar to the pre-registered user's face in terms of size, position, or relative distance, the controller 110 may determine that the face recognized from the image matches the registered user's face. If the controller 110 determines that the face recognized from the image matches the registered user's face, the controller 110 proceeds to step 1450. If the controller 110 determines that the face recognized from the image does not match the registered user's face, the controller 110 ends the procedure.

The controller 110 determines whether an object figure recognition function has been activated in step 1450. The controller 110 may determine whether the object figure recognition function is active. An object figure refers to any figure other than a facial figure. The object figure recognition function is a technology of recognizing an object figure through a camera and providing various UIs based on the recognized object figure. The object figure recognition function may be active (ON) or inactive (OFF) in the mobile device 100. The controller 110 may determine whether the object figure recognition function may be active or inactive in the mobile device 100. The controller 110 may activate or deactivate the object figure recognition function by detecting a user input. If the object figure recognition function is active, the controller 110 may proceed to step 1470.

If the object figure recognition function is inactive, the controller 110 executes a function corresponding to the face recognition in step 1460. When the controller 110 determines that the object figure recognition function is inactive, the controller 110 executes only the function corresponding to the face recognition. The function corresponding to the face recognition may be preset and stored in the memory 175. For example, the function corresponding to the face recognition may be a function of changing the mobile device 100 from a locked state to an unlocked state, if the first state is the locked state.

Figure 15C:
FIG. 15C illustrates a mobile device placed in an unlocked state according to an exemplary embodiment of the present invention.

FIG. 15C illustrates a mobile device placed in an unlocked state according to an exemplary embodiment of the present invention.

Referring to FIG. 15C, the controller 110 may switch the mobile device 100 to the unlocked state. Alternatively, the function corresponding to the face recognition may be a function of executing a predetermined application.

Referring back to FIG. 14, if the object figure recognition function is active, the controller 110 extracts an object figure or at least one additional component included in the object figure by analyzing the acquired image in step 1470. When the controller 110 determines that the object figure recognition function is active in step 1450, the controller 110 extracts the object figure or the at least one additional component included in the object figure by analyzing the acquired image. Accordingly, the controller 110 extracts the object figure or the at least one additional component included in the object figure by analyzing the image that has been acquired in step 1420.

Figure 15D:
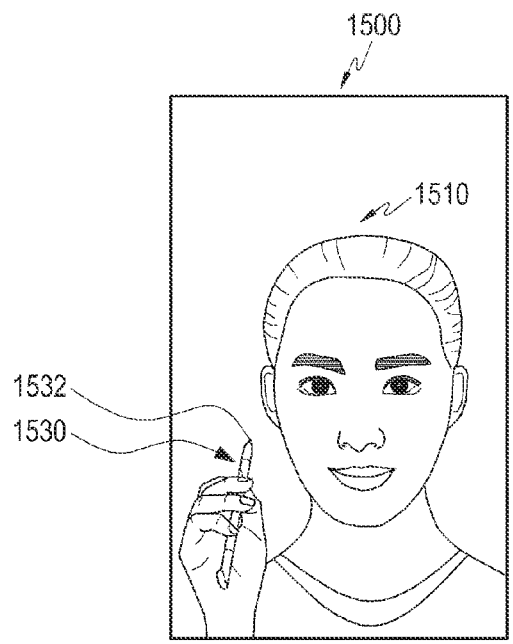
FIG. 15D illustrates extraction of an object figure or at least one additional component included in the object figure by analyzing an image acquired through a camera according to an exemplary embodiment of the present invention.

FIG. 15D illustrates extraction of an object figure or at least one additional component included in an object figure by analyzing an image acquired through a camera according to an exemplary embodiment of the present invention.

Referring to FIG. 15D, the image 1500 acquired in step 1420 is illustrated. The controller 110 may extract an object figure 1530 by analyzing the image 1500. For example, the object figure 1530 may a pen. The controller 110 may extract at least one additional component included in the object figure 1530 by analyzing the image 1500. For example, the at least one additional component may be a pen point 1532. Accordingly, the controller 110 may extract the object figure 1530 such as a pen or the at least one additional component 1532 such as a pen point by analyzing the image 1500 acquired through the camera. In this manner, exemplary embodiments of the present invention advantageously provide a mobile device for extracting an object figure or an additional component by analyzing an image acquired through a camera and a method for controlling the mobile device.

Referring back to FIG. 14, the controller 110 switches the mobile device to a predetermined second state corresponding to the object figure or the at least one additional component in step 1480. The controller 110 may switch the mobile device 100 to the predetermined second state corresponding to the object figure or the at least one additional component that has been extracted in step 1470. The predetermined second state corresponding to the object figure or the at least one additional component may be pre-stored in the memory 175. For example, the extracted object figure may be a pen and the at least one extracted additional component may be a pen point. The second state corresponding to the pen or the pen point may be a note application execution state. Accordingly, if the extracted object figure or the extracted at least one additional component is a pen or a pen point, the controller 110 may switch the mobile device 100 to the note application execution state as the predetermined second state corresponding to the pen or pen point.

Figure 15E:
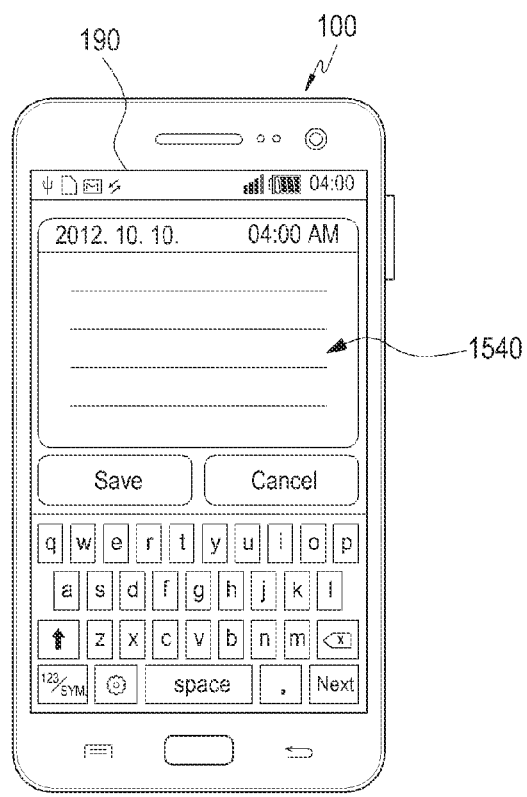
FIG. 15E illustrates execution of a memo application in a mobile device according to an exemplary embodiment of the present invention.

FIG. 15E illustrates execution of a memo application in a mobile device according to an exemplary embodiment of the present invention.

Referring to FIG. 15E, the note application 1540 is executed as the predetermined second state corresponding to the pen or the pen point.

Accordingly, exemplary embodiments of the present invention advantageously provide a mobile device for switching to a preset state corresponding to an object figure or an additional component and a method for controlling the mobile device.

As is apparent from the above description, exemplary embodiments of the present invention can advantageously provide a mobile device having an enhanced face recognition function using an additional component and a method for controlling the mobile device.

Exemplary embodiments of the present invention can advantageously provide a mobile device for extracting an additional figure or an additional component by analyzing an image acquired through a camera and a method for controlling the mobile device.

Exemplary embodiments of the present invention can advantageously provide a mobile device for switching to a preset state corresponding to an additional figure or an additional component and a method for controlling the mobile device.

Exemplary embodiments of the present invention can advantageously provide a mobile device for providing an unlock function by a face recognition function and switching to a preset state corresponding to an additional figure or an additional component by extracting the additional figure or the additional component, and a method for controlling the mobile device.

Exemplary embodiments of the present invention can advantageously provide a mobile device for executing a predetermined action corresponding to an additional figure or an additional component, and a method for controlling the mobile device.

Exemplary embodiments of the present invention can advantageously provide a mobile device for extracting at least one additional component and switching to a preset state corresponding to at least one of the number of the at least one additional component, the presence or absence of any additional component in the vicinity of a main component, the shape of the at least one additional component, and a motion of the at least one additional component, and a method for controlling the mobile device.

Exemplary embodiment of the present invention can advantageously provide a mobile device for extracting an object figure or an additional component and switching to a preset state corresponding to the extracted object figure or additional component, and a method for controlling the mobile device.

It will be understood that exemplary embodiments of the present invention can be implemented in hardware, software, or a combination thereof. The software may be stored in a volatile or non-volatile memory device like a ROM irrespective of whether data is deletable or rewritable, in a memory like a RAM, a memory chip, a device, or an integrated circuit, or in a storage medium to which data can be recorded optically or magnetically and from which data can be read by a machine (e.g. a computer), such as a CD, a DVD, a magnetic disk, or a magnetic tape. Further, the exemplary embodiments of the present invention can be implemented in a computer or portable terminal that has a controller and a memory, and the memory is an example of a machine-readable storage medium suitable for storing a program or programs including commands to implement the exemplary embodiments of the present invention. Accordingly, the present invention includes a program having a code for implementing the apparatuses or methods defined by the claims and a storage medium readable by a machine that stores the program.

The mobile device can receive the program from a program providing device connected by cable or wirelessly and store it. The program providing device may include a program including commands to implement the exemplary embodiments of the present invention, a memory for storing information required for the exemplary embodiments of the present invention, a communication module for communicating with the mobile device by cable or wirelessly, and a controller for transmitting the program to the mobile device automatically or upon request of the mobile device.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

While the invention has been particularly shown and described with reference to certain exemplary embodiments thereof, it will be understood by those of ordinary skill in the art that various changes in form and details may be made therein without departing from the spirit and scope of the present invention as defined by the appended claims and their equivalents.

What is claimed is:

1. A method for controlling a mobile device having a face recognition function using an additional component, the method comprising:
   acquiring an image through a camera of the mobile device, in a first state of the mobile device;
   extracting a facial figure and at least one main component included in the facial figure by analyzing the acquired image;
   determining whether a face recognized from the image using the face recognition function matches a registered user's face based on the extracted facial figure and the at least one main component;
   extracting at least one of an additional figure in the acquired image and at least one additional component included in the additional figure, if the face recognized from the image matches the registered user's face; and
   switching the first state of the mobile device to a predetermined second state of a plurality of second states in response to the extraction of the at least one of the additional figure and the at least one additional component,
   wherein each state of the plurality of second states constitutes one of a plurality of unique software applications executing a plurality of functions of the mobile device, each function of the plurality of functions different from each other function of the plurality of functions and different from a function of the first state, and
   wherein the predetermined second state corresponds to the extracted at least one additional figure and the at least one additional component.

2. The method of claim 1, wherein the at least one additional figure is a hand and the at least one additional component is a finger.

3. The method of claim 1, further comprising:
   determining whether the face recognition function has been activated in the first state of the mobile device, wherein the first state is a locked state, and
   wherein the determination whether the face recognition function has been activated in the first state of the mobile device comprises:
   detecting an unlock trigger in the locked state; and
   determining whether the face recognition function has been activated, upon detection of the unlock trigger.

4. The method of claim 1, further comprising switching the mobile device to an unlocked state, if the face recognized from the image matches the registered user's face.

5. The method of claim 1, wherein the first state is a state of executing a first action and the predetermined second state is a state of executing a second action.

6. The method of claim 5, wherein the first action is execution of a first application and the second action is execution of a second application.

7. The method of claim 1, wherein the predetermined second state is preset in correspondence with a number of the extracted additional component.

8. The method of claim 1, wherein the predetermined second state is preset in correspondence with at least one additional component extracted from a predetermined area near to the extracted at least one main component.

9. The method of claim 1, wherein the predetermined second state is preset in correspondence with at least one of a shape of the extracted at least one additional figure and a shape of the extracted at least one additional component.

10. The method of claim 1, wherein the predetermined second state is preset in correspondence with a motion of the extracted at least one additional component.

11. The method of claim 1, wherein the at least one additional figure is an object.

12. A non-transitory computer-readable storage medium storing instructions that, when executed, cause at least one processor to perform the method of claim 1.

13. A mobile device having a face recognition function using an additional component, the mobile device comprising:
- a camera configured to acquire an image; and
- at least one processor configured to:
  - control the camera to acquire an image in a first state of the mobile device,
  - extract a facial figure and at least one main component included in the facial figure by analyzing the acquired image,
  - determine whether a face recognized from the image using the face recognition function matches a registered user's face based on the extracted facial figure and the at least one main component,
  - extract at least one of an additional figure in the acquired image and at least one additional component included in the additional figure, if the face recognized from the image matches the registered user's face, and
  - switch the first state of the mobile device to a predetermined second state of a plurality of second states in response to the extraction of the at least one of an additional figure and the at least one additional component,
- wherein each state of the plurality of second states constitutes one of a plurality of unique software applications executing a plurality of functions of the mobile device, each function of the plurality of functions different from each other function of the plurality of functions and different from a function of the first state, and
- wherein the predetermined second state corresponds to the extracted at least one additional figure and the at least one additional component.

14. The mobile device of claim 13, wherein the additional figure is a hand and the at least one additional component is a finger.

15. The mobile device of claim 13, wherein the first state is a locked state, and
wherein the at least one processor is further configured to:
- determine whether the face recognition function has been activated in the first state of the mobile device,
- detect an unlock trigger in the locked state, and
- determine whether the face recognition function has been activated, upon detection of the unlock trigger.

16. The mobile device of claim 13, wherein if the face recognized from the image matches the registered user's face, the at least one processor is further configured to switch the mobile device to an unlocked state.

17. The mobile device of claim 13, wherein the first state is a state of executing a first action and the predetermined second state is a state of executing a second action.

18. The mobile device of claim 17, wherein the first action is execution of a first application and the second action is execution of a second application.

19. The mobile device of claim 13, wherein the predetermined second state is preset in correspondence with a number of the extracted additional component.

20. The mobile device of claim 13, wherein the predetermined second state is preset in correspondence with at least one additional component extracted from a predetermined area near to the extracted at least one main component.

21. The mobile device of claim 13, wherein the predetermined second state is preset in correspondence with at least one of a shape of the extracted at least one additional figure and a shape of the extracted at least one additional component.

22. The mobile device of claim 13, wherein the predetermined second state is preset in correspondence with a motion of the extracted at least one additional component.

23. The mobile device of claim 13, wherein the at least one additional figure is an object.

* * * * *